(12) United States Patent
Brunet

(10) Patent No.: US 6,618,321 B2
(45) Date of Patent: Sep. 9, 2003

(54) METHOD FOR SIMULATING STREAMER POSITIONING, AND FOR NAVIGATION AID

(75) Inventor: Philippe Brunet, Bures sur Yvette (FR)

(73) Assignee: CGG Marine (FR)

(*) Notice: Subject to any disclaimer, the term of this patent is extended or adjusted under 35 U.S.C. 154(b) by 0 days.

(21) Appl. No.: 10/018,176

(22) PCT Filed: Apr. 11, 2001

(86) PCT No.: PCT/FR01/01105
§ 371 (c)(1),
(2), (4) Date: May 24, 2002

(87) PCT Pub. No.: WO01/79890
PCT Pub. Date: Oct. 25, 2001

(65) Prior Publication Data
US 2003/0012083 A1 Jan. 16, 2003

(30) Foreign Application Priority Data
Apr. 13, 2000 (FR) .............................. 00 04760

(51) Int. Cl.$^7$ .................................................. G01V 1/38
(52) U.S. Cl. ......................................................... 367/19
(58) Field of Search .............................. 367/19, 130, 13, 367/106

(56) References Cited

U.S. PATENT DOCUMENTS

| 4,068,208 A | * | 1/1978 | Rice et al. ..................... 367/19 |
| 5,031,159 A | * | 7/1991 | Rouquette ..................... 367/19 |

* cited by examiner

Primary Examiner—Ian J. Lobo
(74) Attorney, Agent, or Firm—Duane Morris LLP

(57) ABSTRACT

The invention relates to a method of simulating the positioning of a streamer towed by a ship (10) during an operation of acquiring geophysical data at sea, said acquisition operation making use of shots from at least one sound source (Sa), the method implementing a hydrodynamic model of the interaction between marine current, the path of the ship, and the streamer, the method being characterized in that it includes determining variations in the current over time and in space. The invention also relates to a method of assisting navigation for a seismic survey ship, and to a method of predicting coverage fraction by implementing such a simulation method.

27 Claims, 8 Drawing Sheets

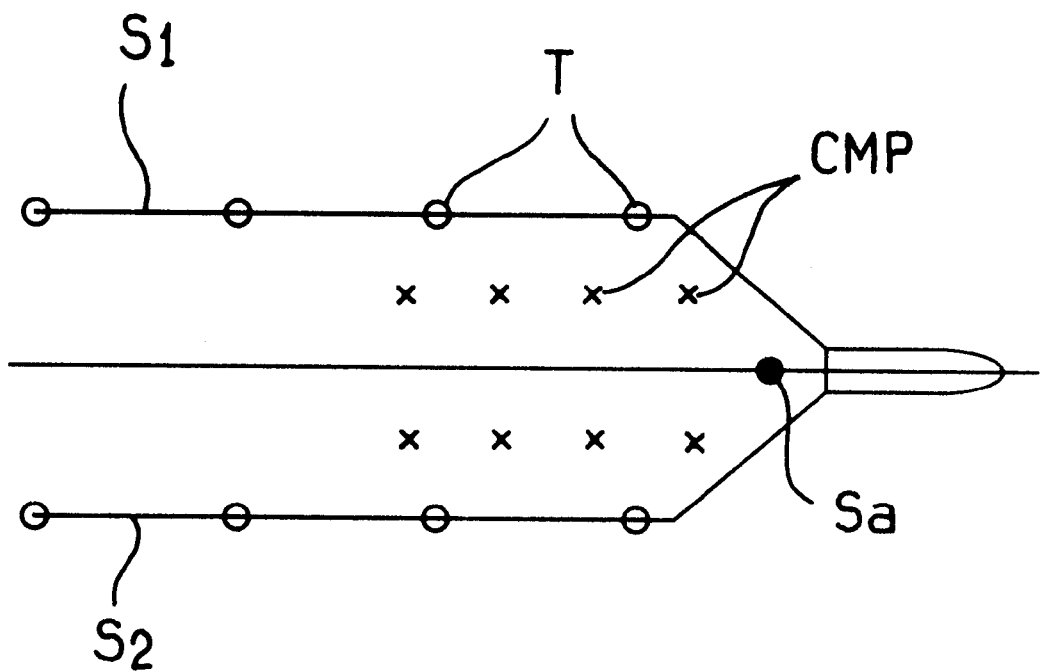
FIG_1

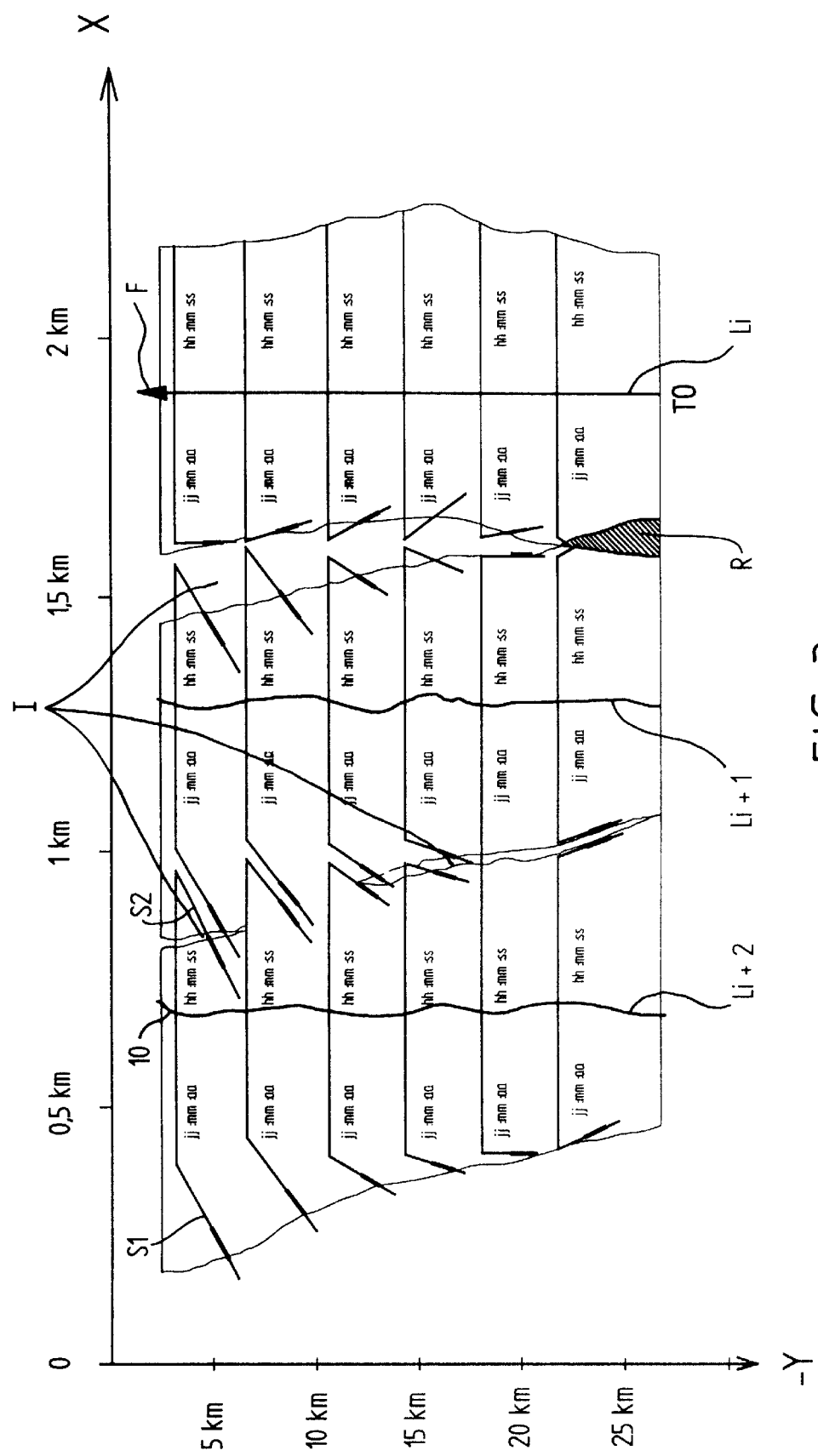
FIG_3

Prediction at 1 hour with Gauss

Prediction at 1 hour with conjugate gradient

Prediction at 1 hour with Gauss

Prediction at 1 hour with conjugate gradient

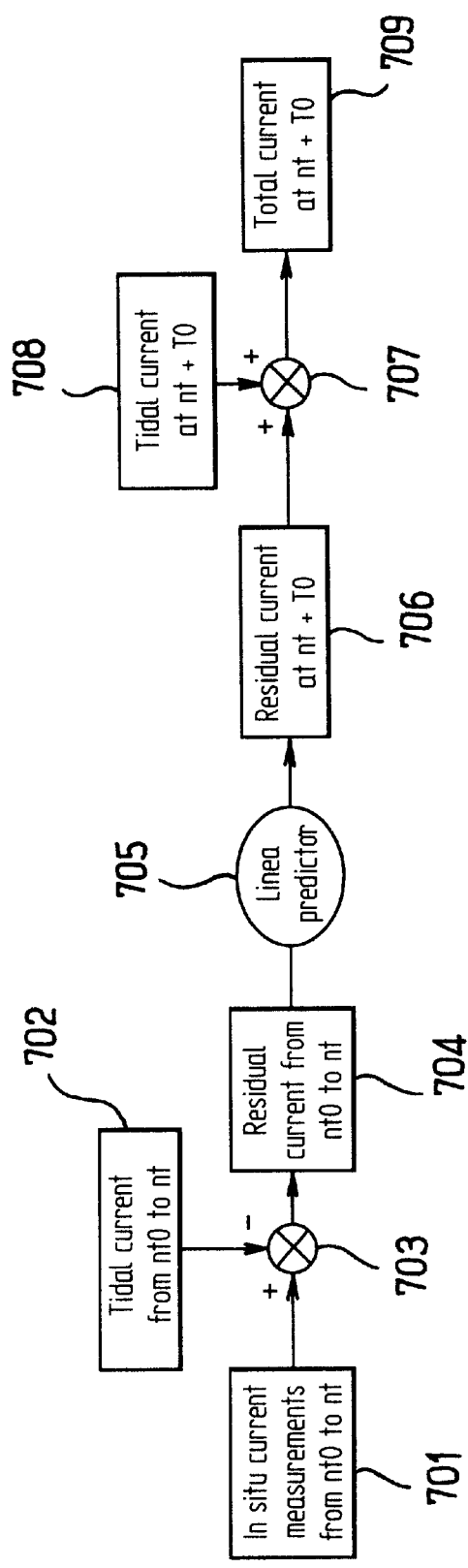
FIG_6
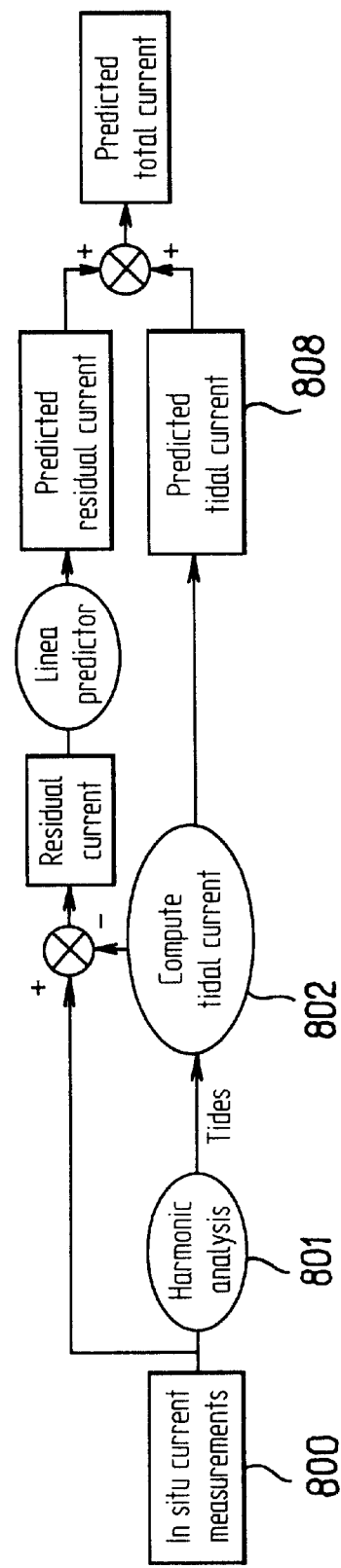
FIG_7

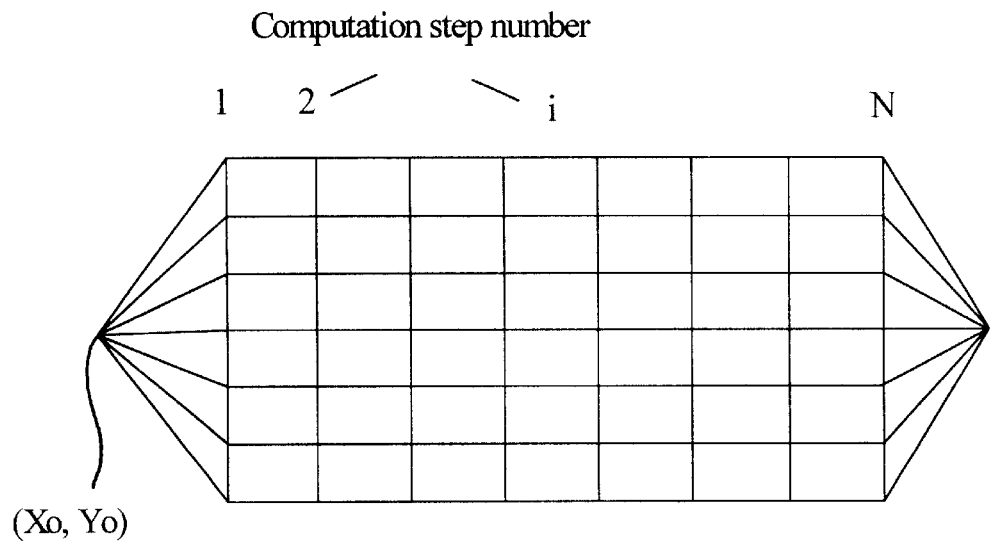
FIG_9
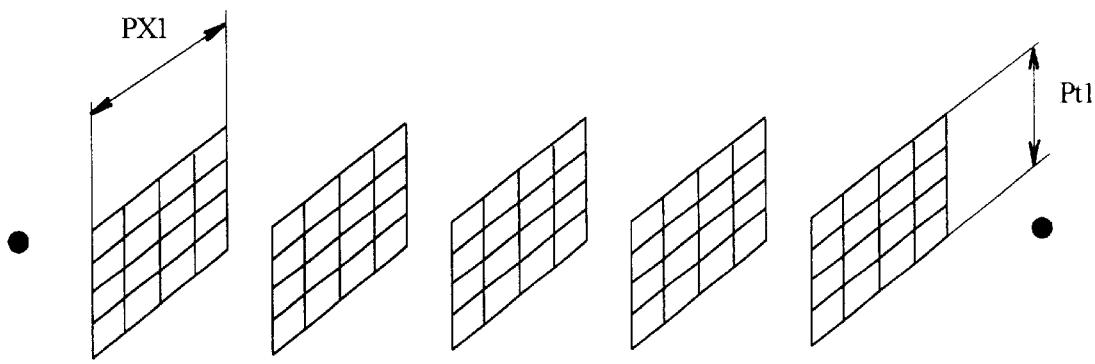
FIG_10
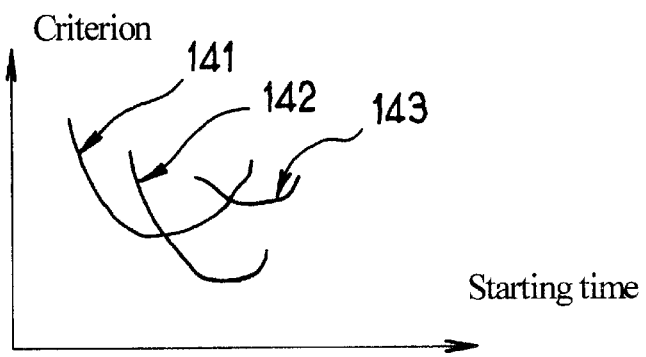
FIG_13

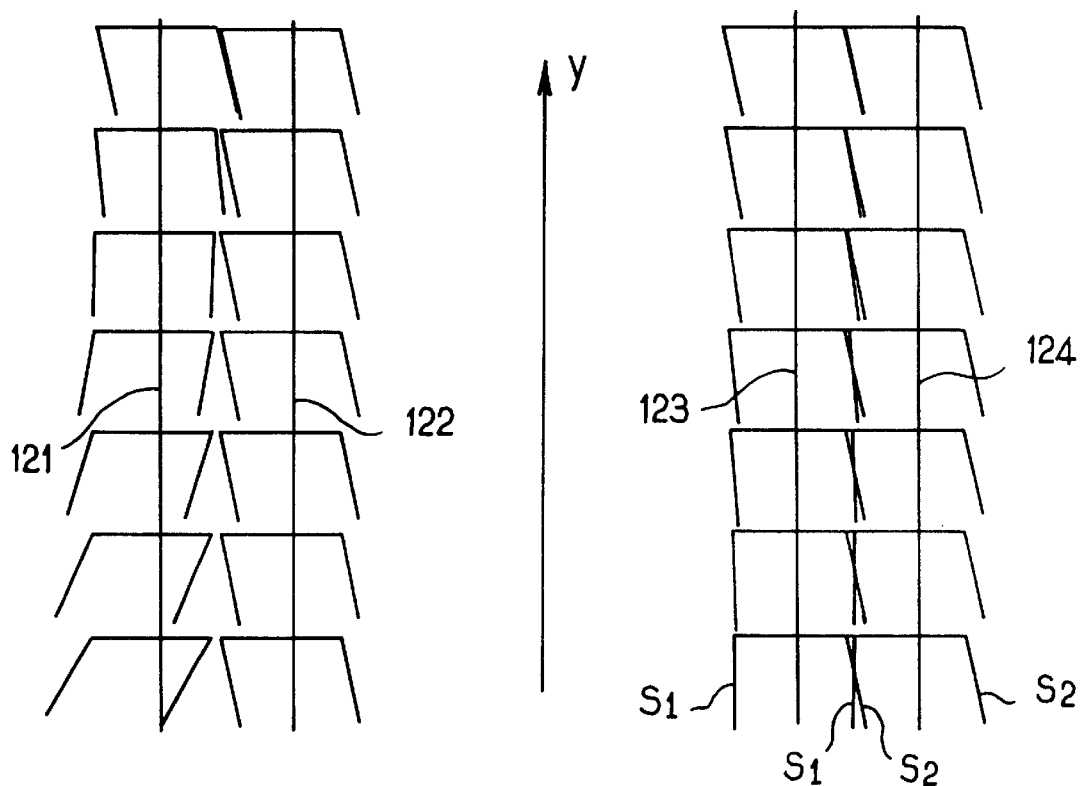
FIG_11
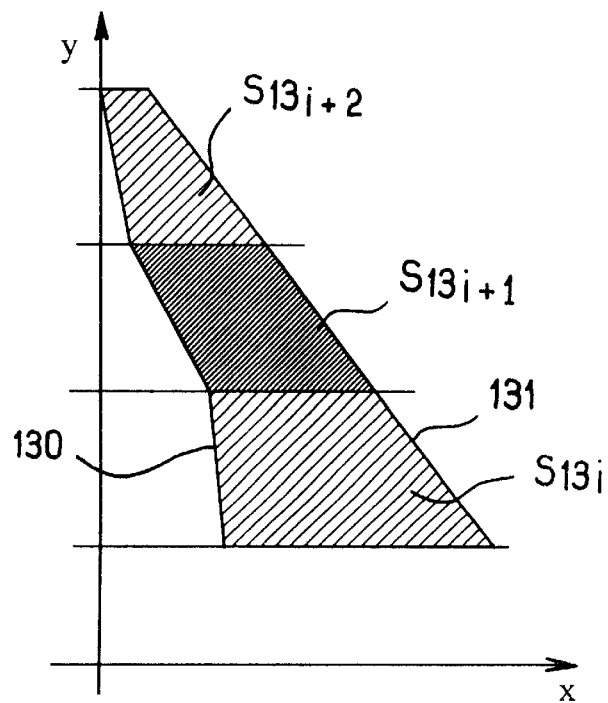
FIG_12

METHOD FOR SIMULATING STREAMER POSITIONING, AND FOR NAVIGATION AID

CROSS-REFERENCE TO RELATED APPLICATIONS

The present invention claims priority from PCT application FR01/01105.

FIELD OF THE INVENTION

The invention relates in general to operations performed at sea for acquiring geophysical data by means of a ship towing one or more cables associated with hydrophones.

More precisely, the invention relates to a method enabling the deformation of the cables towed by a ship to be predicted effectively, and it enables advantage to be taken of such prediction.

BACKGROUND OF THE INVENTION

The purpose of geophysics is to describe the structure of the subsoil. The technique in widest use is reflection seismic surveying. When surveying off-shore, the principle is to emit a high power sound pulse towards the subsoil; the sound wave created in this way is reflected partially at the interfaces between the successive geological layers it encounters, and it returns towards the surface where hydrophones transform the sound signal into electrical signals.

In off-shore surveying, the sound source is generally constituted by air guns, and the hydrophones are grouped together in groups which are integrated in cables known as "streamers" that are towed by the ship.

The number of sound sources and streamers, and the lengths of the streamers can be varied. Depending on required resolution, the distance between two consecutive groups varies over the range 12.5 meters (m) to 25 m. A simple configuration having two streamers S1 and S2, a single sound source Sa, and a plurality of groups T is shown in FIG. 1.

This figure also shows the so-called "common midpoints" (CMPs) that, for each {source, group} pair correspond to the subsurface point of reflection.

In practice, interaction between sea currents and immersed streamers gives rise to geometrical deformations in the system constituted by said streamers and the set of towed elements, thereby compromising the uniformity of coverage in the zone whose subsoil is to be characterized. These deformations vary in time and give rise to coverage "holes" which need to be filled in by additional passes of the boat, a process known as "infilling".

This constitutes a major drawback since additional passes increase the time required to perform operations and can give rise to very significant increases in cost (which can be as much as 20%).

In addition, the extra time and cost associated with infilling can vary very greatly from one operation to another, and it is therefore not possible to predict them accurately, thus preventing operators from giving accurate predictions concerning the time and cost of a projected operation; this constitutes an additional drawback for operators.

It will thus be understood that there exists a manifest need to reduce infilling and also to predict the amount of infilling that will be required in a projected data acquisition operation. In order to satisfy these needs, it is necessary to characterize the influence of current on streamer deformation.

In this respect, attempts have been made to model the deformation of a streamer towed by a ship and subjected to current. For example, reference can be made to the article "The shape of a marine streamer in a cross-current" by P. P. Krail and H. Brysk, published in Vol. 54, No. 3 of the journal of the Society of Exploitation Geophysicists.

However, such attempts do not reproduce real current conditions (the article mentioned assumes in particular that the current is steady and the ship follows a uniform rectilinear path) and a result the results thereof are unsuitable for being used directly so the above drawbacks remain.

BRIEF SUMMARY OF THE INVENTION

The object of the invention is to enable those drawbacks to be reduced.

To achieve this object, the invention firstly provides a method of simulating the positioning of a streamer towed by a ship during an operation of acquiring geophysical data at sea, said acquisition operation making use of shots from at least one sound source, the method implementing a hydrodynamic model of the interaction between marine current, the path of the ship, and the streamer, the method being characterized in that it includes determining variations in the current over time and in space.

Other preferred, but non-limiting features of the method of the invention for simulating the positioning of a streamer are as follows:

the method comprises:
  receiving primary current values as measured and/or predicted;
  defining vector fields or 'current objects' of respective types corresponding to different representations of the current and built up from said primary current values; and
  selecting a 'current object' as a function of the intended application;

'current object' selection takes account of proximity in time between the instant for which the prediction is made and the instant at which prediction is performed;

'current object' selection takes account of correlation between earlier 'current object' predictions and measurements of current performed at the instants for which said earlier predictions were made;

the coordinates of at least some 'current objects' comprise values measured on site;

the coordinates of at least some 'current objects' comprise extrapolated values predicting current;

some 'current objects' are computed by using a predictor filter enabling a current data series to be extrapolated from measurements of current made in the acquisition zone;

the defined types of 'current object' comprise the following types:
  1) total current as measured by a current meter;
  2) tidal current as derived from meteorological bulletins, or as deduced from measurements of current by harmonic analysis;
  3) the sum of a tidal current plus a residual current, said tidal current being derived from meteorological bulletins or being deduced from measurements of current by harmonic analysis, and said residual current being taken from meteorological bulletins;
  4) an extrapolation from total current as measured by a current meter;
  5) the sum of a tidal current and a computed residual current, said tidal current being taken from meteorological bulletins or being deduced from measurements of current by harmonic analysis, and said residual current being obtained by subtracting said tidal current from the current measured in the acquisition zone;

6) a history of past extrapolations of the total current as measured by a current meter; and 7) the sum of a tidal current and a history of past extrapolations of a series of values constituted by the total current as measured by a current meter from which a tidal current has been subtracted, said tidal current being taken from meteorological bulletins or being deduced from measurements of current by harmonic analysis;

while computing 'current objects' of types 4, 5, 6, or 7, the processed data series is considered as a second order non-centered steady random process;

while computing values of a 'current object' of type 4, 5, 6, or 7, weights are given to the measurements of the data series for extrapolation, which weights are inversely proportional to their age, for the purpose of anticipating sudden changes due to the residual current;

while computing a particular value of a 'current object' of type 4, 5, 6, or 7, a variance function of the difference between the predicted value and the exact value of the current or the residual current at the instant for which the prediction was computed is minimized, where said variance function has the form:

$$G = \left(1 - 1 - \sum_{i=3}^{P+1} a_i a_3 \cdots a_{P+1}\right) \Gamma_U \begin{pmatrix} 1 \\ -1 - \sum_{i=3}^{P+1} a_i \\ a_3 \\ \vdots \\ a_{P+1} \end{pmatrix}$$

while computing a particular value of a 'current object' of type 4, 5, 6, or 7, an autocorrelation function of the current or residual current data series is computed, and then a linear system of equations is set up and solved;

while computing a particular value of a 'current object' of type 4, 5, 6, or 7, the linear system to be solved is conditioned by implementing a descent method, preferably the conjugate gradient method;

the method provides the option of computing extrapolated values on a series of measured current values from which a tidal current has previously been subtracted so as to compute an extrapolated residual current, and then adding the tidal current corresponding to the instant for which the extrapolation has been made to said extrapolated residual current;

the method comprises estimating the performance of different predictions of current by comparison with a measurement of current performed at the time corresponding to the time of the predictions;

the method comprising estimating the performance of a 'current object' derived from predictions and/or measurements of current by comparing the measured streamer positioning and the simulated streamer positioning, said simulation taking account of the 'current object' whose performance is to be estimated; and the performance of the 'current object' is described by criteria which comprise the average of the absolute value of the difference between measurement and simulation of streamer positioning, and/or the difference between predicted and measured streamer positioning below the value for which 90% of the prediction points are to be found.

The invention also provides a method of assisting the navigation of a ship towing at least one streamer in order to reduce zones of undercoverage and/or overcoverage generated during a geophysical data acquisition operation at sea during which the ship travels along a plurality of lines extending in a general direction defining an abscissa and forming an array covering a desired zone, the method being characterized in that it implements a method of simulating streamer positioning according to any of the above-mentioned features.

Preferred but non-limiting features of the method of the invention for assisting navigation are as follows:

it comprises determining the set of {ship position; instant} pairs at regular intervals in space so as to define a track along which the orientation of the streamer at a given abscissa along the general orientation of the lines of the array is as close as possible to the orientation of an associated streamer during a previous pass of the ship along an adjacent line;

the method comprises the following steps:
selecting a 'current object' of appropriate type;
defining optimization parameters;
computing the positioning of a 'reference streamer' from data relating to the streamer positioning of the adjacent profile and the optimization parameters;
taking account of ship speed and direction data and streamer positioning data at the time optimization computation is started;
creating a three-dimensional optimization grid with a first dimension (Y) parallel to said general direction, a second direction (X) being perpendicular to the general direction, and included in the horizontal plane, and the third dimension (DT) representing possible time increments between two nodes spaced apart by one grid cell in the general direction (Y);
simulating variations in the positioning of the streamer towed by a ship following all of the tracks defined by the nodes of the optimization grid;
for all of the possible tracks, computing a norm of the difference between simulated streamer positioning and reference streamer positioning; and
computing an optimum track for which the associated norm is a minimum;

the optimization step comprises minimizing a norm of the difference between reference streamer positioning and simulated streamer positioning;

said normal to be minimized has the form:

$$H(X1, \delta t1) = \sum_{j=1}^{J} \sum_{k=1}^{K} \left| X_{reference}(k, j) - X_{predicted}(k, j) \right| f(k)$$

where:

X1 is a series of J consecutive values for the position of the streamer head along the horizontal direction of the optimization grid perpendicular to the general direction;

δt1 is a series of J consecutive values for the duration taken by the streamer head to pass form one node of the optimization grid of coordinates $(X_{i1}, Y_j, \delta t_{k1})$ to a node having coordinates $(X_{i2}, Y_{j+1}, \delta t_{k2})$;

J is the number of nodes of the grid in said general direction (Y);

K is the number of curvilinear abscissa points along the discretized streamer;

$X_{reference}(k,j)$ is the position along the X axis of the point "k" of the 'reference streamer' when the head thereof is at the jth plane of the optimization grid along the Y axis;

$X_{predicted}(k,j)$ is the position along the X axis of the point "k" of the simulated streamer when the head thereof is at the jth plane of the optimization grid along the Y axis; and f(k) is a weighting function applied to the difference between the simulated streamer and the reference streamer;

the method implements an optimization criterion for said difference between the measured and predicted streamer-positioning data; and the step of optimizing zone coverage is implemented in real time so as to provide the ship with a series of {instant; ship position; ship speed} triplets to follow so as to optimize the path of the ship along a line that the ship is surveying.

The invention also proposes an application of the method of assisting navigation as outlined above, to determining a path and a starting time associated with a forthcoming line that is to be surveyed by the ship, and also for determining the best forthcoming line to survey. In this application, in a preferred feature, a line starting time is sought from within a given time window that corresponds to minimizing undercoverage and overcoverage.

Finally, the invention provides a method of predicting the coverage fraction associated with an operation of acquiring geophysical data that is to be performed at sea over a given zone, the method being characterized in that it implements simulating the track of a ship including a method of assisting navigation as outlined above.

BRIEF DESCRIPTION OF THE DRAWINGS

Other features, objects, and advantages of the invention will appear more clearly on reading the following description of a preferred but non-limiting implementation of the invention given with reference to the accompanying drawings in which, in addition to FIG. 1 described above in the introduction to this specification:

FIG. 3 shows the coverage achieved in a zone, and serves in particular to show up the infill zones;

FIGS. 6 and 7 are of the block diagram type showing the current processing and predicting of current as implemented in the invention;

FIGS. 9 and 10 are optimization diagrams implemented in the methods of the invention;

FIG. 11 is a diagram showing two pairs of adjacent profiles, one of which is optimized for reducing the amount of infilling;

FIG. 12 is a graphical representation of a function to be minimized in the invention; and FIG. 13 shows three different profiles of a performance criterion concerning streamer drift prediction as implemented in a method of the invention for assisting navigation.

DETAILED DESCRIPTION OF THE INVENTION

Figure 2A:
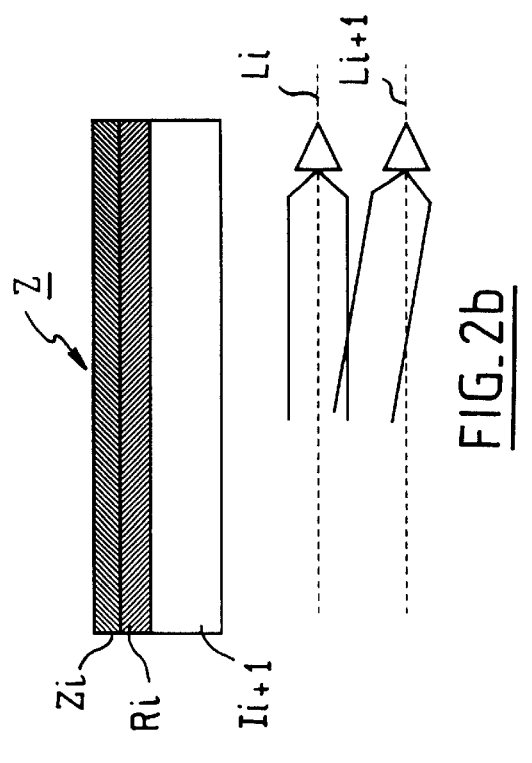
FIGS. 2a to 2d are diagrams of a ship towing streamers in operation and of the coverage zones generated by the passage of the ship.

With reference now to FIG. 2a, there can be seen a diagram of a ship 10 traveling in the direction of an arrow F, along a path (also referred to as a "line" or "profile") Li. Two streamers S1 and S2 are shown diagrammatically behind the ship, each streamer carrying groups of geophysical sensors (not shown in the figure). These streamers can correspond to the two streamers situated at the outermost sides of a set comprising a larger number of streamers.

The line Li forms part of an array (not shown) of lines covering a zone Z (shown in the top of the figure) that is to be surveyed, said array constituting a "bin grid".

The ship thus describes a set of lines that are generally parallel to one another (all of the lines of the bin grid extending in the same general direction), with the distance between two adjacent lines Li and Li+1 as shown in FIG. 2a being selected so as to obtain the desired continuity of coverage between measurements of streamer S2 when the ship is passing along line Li and measurements of streamer S1 in the following pass made by the same ship along line Li+1.

This desired continuity of coverage is represented in the top portion of FIG. 2a where different individual zones within the zone Z to be covered are shown, said individual zones being covered by the streamers of the ship 10 as it travels along the lines Li and Li+1.

Thus, while the ship was passing along the line Li the streamers covered an individual zone Zi, and while the ship was passing along the line Li+1, the streamers covered an individual zone Zi+1. The two individual zones Zi and Zi+1 are contiguous.

FIG. 2a corresponds to an ideal configuration in which the streamers extend parallel to the track of the ship and as a result coverage of the subsurface is uniform and sufficiently dense.

Figure 2B:
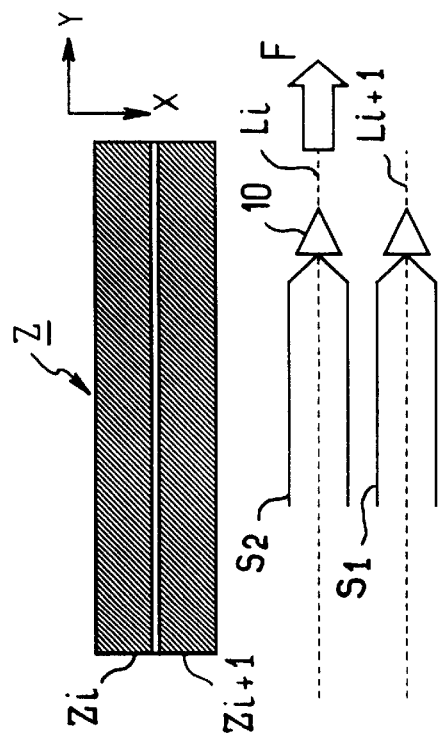

In FIG. 2b, it can be seen that unlike the case shown in FIG. 2a, the streamers do not have the same orientation relative to the ship during the respective passes along lines Li and Li+1, the set of streamers being in alignment with the path of the ship only during its pass along line Li, whereas during the subsequent pass of the ship along line Li+1, the portion of the streamers furthest from the ship is offset transversely towards the line Li. This is typically due to the presence of a current flowing across the lines Li and Li+1 while the ship is passing along line Li+1.

Consequently, it can be seen in the top portion of FIG. 2b that the zone Z has been covered in part only, with an overlap zone Ri being generated (which corresponds to "overcoverage") while a portion Ii+1 of the zone Z is not properly covered during the pass of the ship along line Li+1, and thus corresponds to a zone that is not actually covered ("undercoverage").

Figure 2C:
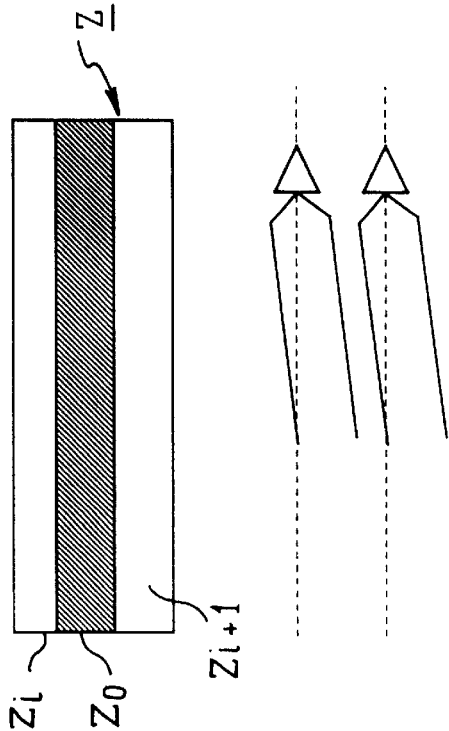

FIG. 2c shows what happens when the change in current between two consecutive passes causes the zones covered by the sets of streamers to diverge during said two passes, thus leaving a zone $I_0$ of the subsurface (i.e. below the sea bed beneath the zone) that remains uncovered between the two lines Li and Li+1.

It can thus be seen that depending on current configurations, there exist numerous possibilities for zones to be poorly covered ($I_0$, $I_i+1$). These zones represent areas that need to be filled in by additional passes known as "infills".

It will thus be understood that in operation, current conditions often give rise to such configurations, and certain regions can have currents that are strong and/or variable.

FIG. 3 thus constitutes an illustration of infills I provoked during successive passes by changes in the orientation of the streamers S1 and S2 towed by a ship 10 (represented by a point traveling along its successive path lines Li, Li+1, Li+2).

This figure (where the travel direction of the ship is indicated by arrow F and where the scales of the X and Y axes corresponding to two horizontal directions are not the same) also shows an area R of overcoverage between adjacent passes Li and Li+1.

Figure 2D:
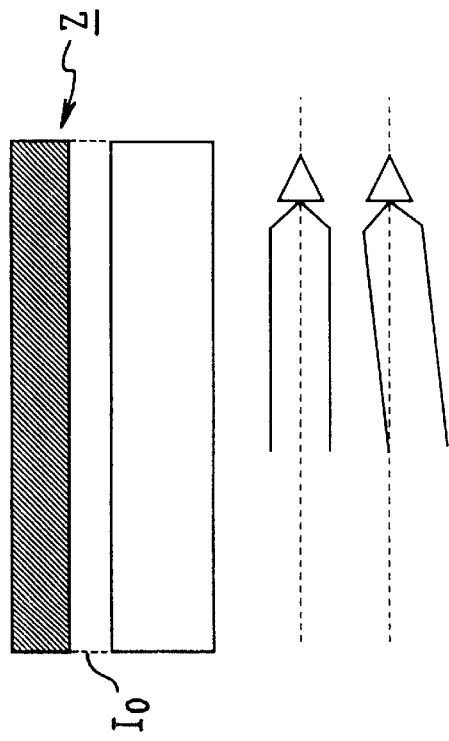

FIG. 2d shows the case where the streamers are subject to the same cross-current during two consecutive passes. The zone Z0 is covered at sufficient density in that said zone has been covered with streamer groups that are the furthest away from the ship on the first pass, and with groups close to the ship on the second pass.

However, there can be seen a zone Zi that was insufficiently covered during the first pass and a zone Zi+1 that was insufficiently covered during the second pass.

A third pass with current identical to that of the first two passes would enable the zone Zi+1 to be covered correctly by adding thereto coverage from the missing group, i.e. the near groups.

Successive identical passes for which the current is identical (so the streamers are parallel) thus make it possible, in application of the same principle, to cover an entire zone being surveyed, leaving only two marginal zones with insufficient coverage.

A configuration of the type shown in FIG. 2 consequently provides satisfactory coverage of the subsurface.

As explained below, the invention makes use of this principle and enables the track to be followed by the ship on each pass to ensure that the orientation of the streamers during the pass is as closely parallel as possible to the orientation of the streamers during the pass along the previously acquired adjacent profile.

As mentioned, one means for predicting and reducing infills would be to characterize the effect of current on streamer deformation in a manner that is realistic.

To this end, there follows a description of a method of predicting streamer orientation which, in a first aspect of the invention, takes account of variations in current over time, and also of variations in speed and heading of the ship so as to replicate in a manner that is closer to reality the physical interactions between currents and streamers.

General Principles

We begin by recalling certain fundamental characteristics of marine currents; it is known that currents encountered at sea are in fact a superposition of a plurality of components:

tidal currents which are referred to as being "gravitational": their ultimate origin is gravitational attraction; and currents that are referred to as being "radiational": their more or less remote origin is solar radiation which is responsible for phenomena such as wind conditions, seasonal cycles, bad weather, or variations of ocean density in three spatial dimensions that can generate movement within water masses. Radiational currents can be subdivided as follows:

a permanent component that is the result of the mean distribution of climate conditions over the surface of the globe;

a seasonal periodic component that is due to alternating seasons, which can be interpreted as cyclical modulation on the above-mentioned permanent component; and a non-periodic component originating from meteorological effects (weather currents).

By convention, the permanent and seasonal currents are referred to as general currents.

Tidal currents are deterministic and can be predicted over time. General currents are listed and can also be predicted. For example, tables of such currents are to be found in the pilot charts produced by the United States National Oceanographic and Atmospheric Administration (NOAA) and in the Nautical Instructions published by the French Marine Hydrographic and Oceanographic Service (SHOM).

In contrast, the currents generated by weather effects, which can to a first approximation be summarized as currents due to wind, are random. It is therefore advantageous to process them using statistical methods and it is shown below in the present description that the invention provides an original method of predicting such currents and of taking them into account where appropriate when predicting streamer deformation.

It is also known that variations in the various current components do not all take place on the same time scales. Statistical surveys undertaken by the Applicant in various geographical zones distributed over different locations of the planet have shown that depending on the zone in consideration, the relative importance of the various current components can vary significantly.

Consequently, from one zone to another, the characteristics of time variations in total currents are not the same, seasonal variations being predominant in some zones whereas in other zones short-term variability (due essentially to the wind) can be more significant, and yet other zones can have current conditions that are determined mainly by general circulation so they are relatively stable, etc. . . .

As described in the specification below, the cable deformation prediction implemented in the invention cannot be summarized merely as coupling a steady current model with a model for computing streamer deformation as a function of given current conditions.

On the contrary, prediction also takes account of time aspects associated with marine current variations:

by making it possible as a function of the zone to be covered (and optionally also of the duration and the remoteness in time of the period over which geophysical data is to be acquired) to select those current components which will have a significant effect on time variations in total current; and by taking account of the variations due to said components.

The fact that the duration of the data acquisition period is taken into account is of importance particularly for applications of the invention in the short or medium term. It is impossible to predict variations in weather current over a period that is remote in time (i.e. starting a long time after the date at which prediction is made), or even for a period that is too long.

That is why the method of the invention distinguishes between current components to be taken into account when predicting streamer deformation by defining various "types" of current and by enabling a user to select a current "type" that is appropriate for requirements.

Beyond that, the invention also proposes making use of predicted deformation in association with three different time horizons:

real time, during acquisition operations at sea. Here the purpose is to provide the ship with navigation assistance so as to continuously adjust the track of the ship so that at each instant the orientation of the streamers is as close as possible to their orientation at the same level (i.e. on the same position along the abscissa in the Y direction of FIG. 3) during the pass of the ship over the previously surveyed adjacent line, with this being for the purpose of reducing infills in real time. This application is described more particularly in the present specification. To provide such navigation assistance, it is necessary to have a prediction of current (at the depths corresponding to streamer immersion) for a time horizon whose order of magnitude is 1 hour; the present specification also describes the characteristics of a prediction of current step that implements a current predictor (or short-term prediction of current module);

medium term to determine, still during acquisition operations, the best path to be followed by the ship in order to survey the following line. Thus, while the ship is traveling along a line Li, the object of the method at this time scale (about 24 hours) is to determine the best path for the ship to travel along the forthcoming adjacent line Li+1, and also the most suitable time for beginning said line. It will be observed that methods do indeed exist for performing such medium-term prediction. However, obtaining realistic results by predictions of tidal current as implemented by those methods makes it necessary to have accurate bathymetric data at high three-dimensional resolution. Unfortunately, although that type of data is indeed sometimes available (e.g. SHOM data relating to French coastal zones), it is normally not available for zones that are to be surveyed. In any event, for this medium-term time horizon, wind prediction models remain fairly random and the predictions of the effects of wind on current are not reliable;

finally long term, under these circumstances the purpose is not to provide the ship with a track for reducing infills in operation, but to provide an overall prediction of the amount of infilling that will be required due to a ship passing over a given zone, and possibly at a given period (which period can be far in the future). This long-term prediction is then used to enable infills to be taken into account when predicting the cost and the duration of a projected operation.

Real-Time and Medium-Term Applications

Real-time and medium-term applications of the invention as implemented on site are described below. These two types of application are implemented in a method of giving assistance in navigation that is associated with the ship towing the streamers, said navigation assistance method using the predicted streamer deformations in real time or in the medium term to give the ship an optimized track corresponding to minimizing infills (for the present profile or for the next profile to be shot, respectively). In any event, these applications are implemented after the ship has already traveled along a first line.

Characteristics of the System Implemented by the Method for Real-Time and Medium-Term Applications As mentioned above, the Applicant has developed a system enabling this navigation assistance method to be implemented. From the point of view of the user, the system provides three main functions:

currents and streamer drift differences (streamer positions and orientations) are displayed. These parameters can be measured or predicted (by a dedicated module whose characteristics are described below in this specification insofar as they concern currents). On this display, comparing measured and predicted currents and drift differences makes it possible to judge the reliability of meteorological bulletins, of measurements of current, and of extrapolations made thereon;

defining and displaying the best next profile to shoot, i.e. the profile for which the predicted drift of the streamers is closest to the measured drift of an already-acquired adjacent profile at the same Y ordinate position on the bin grid; and defining and displaying in real time while a profile is being recorded the optimum track to be followed to avoid creating zones that are undercovered or overcovered.

Figure 4:
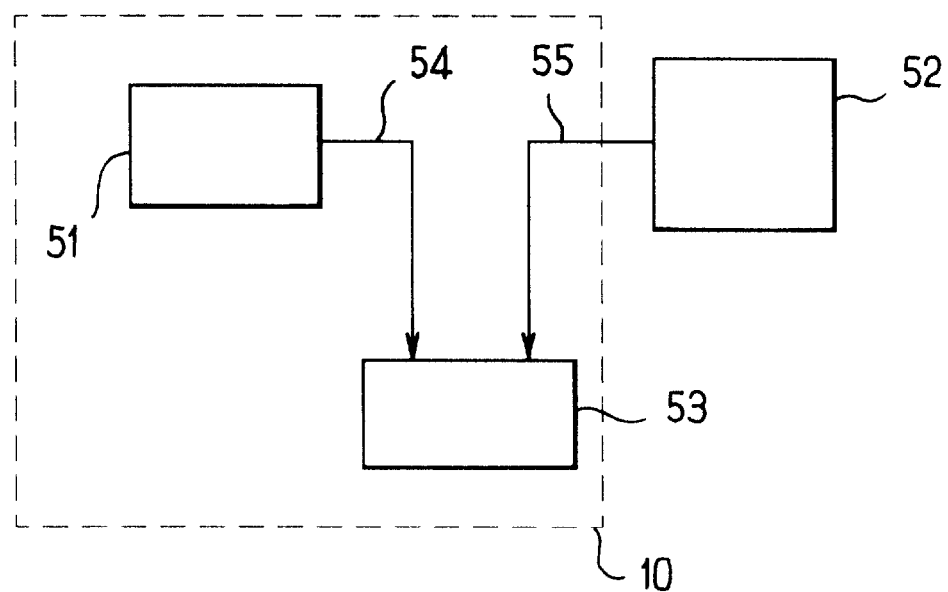
FIG. 4 is a block diagram showing the structure of a system for implementing the invention.
Figure 8:
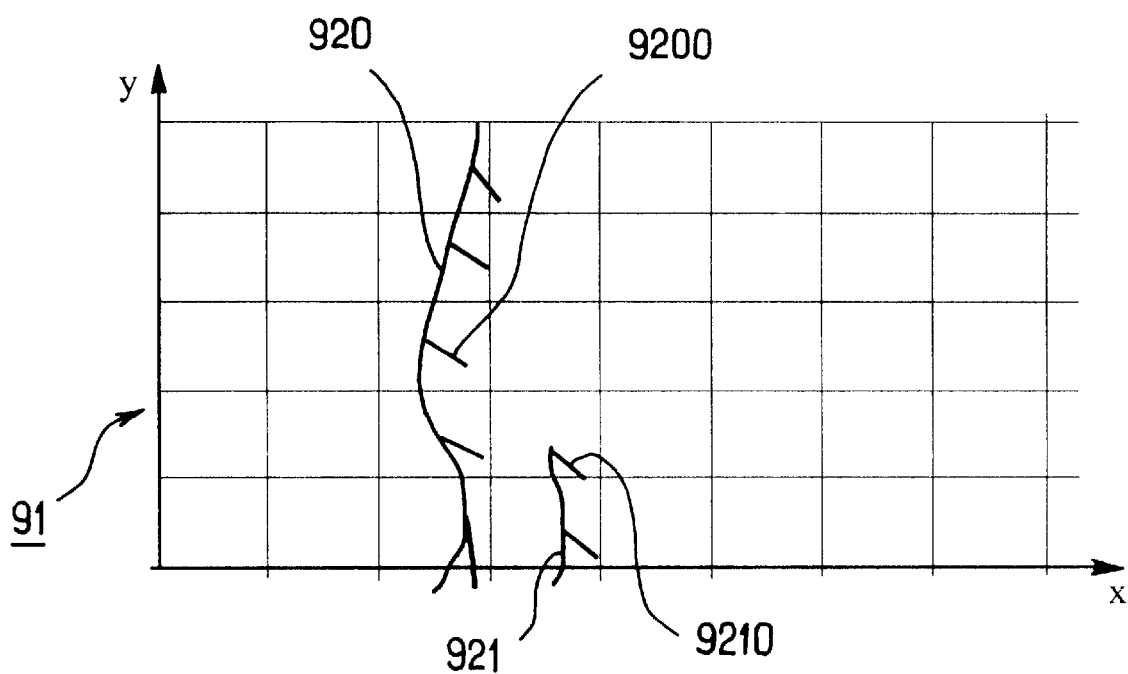
FIG. 8 shows a grid covering a zone to be surveyed and the successive paths of the ship over the grid, together with the orientation of a streamer towed by the ship.

To perform these three functions, the system also implements three subassemblies as shown in FIG. 4:

a navigation software subassembly 51 which performs real-time acquisition:

of the path of the ship (using conventional locating means, such as means implementing one or more differential global positioning system (GPS) receivers);

of current data. This data can be in the form of measurements from a current meter towed by the ship or on board the ship, or as predicted on the basis of meteorological bulletins. This data constitutes "primary" data which is processed in the manner described below in order to implement the invention; and of the measured positions of the streamers, such measurement being performed by a suitable device (for this purpose, each streamer is fitted with a plurality of devices distributed along its length enabling its deformation to be measured and enabling the orientation of each segment of streamer having a device integrated therein to be determined, said devices implementing, for example, magnetic compasses, since only the horizontal components of current are taken into account);

a weather laboratory 52 which supplies predictions of current, wind, tide, and/or swell; and a subassembly 53 for computing coverage and for display purposes, comprising:

a user interface such as a PC type or other computer provided with a screen, a keyboard, and a mouse, together with means for storing data; and a module for defining, computing, and displaying various 'current objects' (defined below in this specification).

The subassemblies 51 and 53 are on board the ship 10 while the weather laboratory 52 can be separate from the ship. The data delivered by the subassembly 51 is conveyed to the subassembly 53 via an Ethernet type link 54, for example, with data from the weather laboratory 52 being conveyed to the same subassembly 53 over a wireless link 55, e.g. a link making use of the Internet and including a radio relay.

Data Received by the Navigation Software Subassembly 53

The subassembly 53 mainly receives four types of data from the subassemblies 51 and 52:

meteorological bulletins and weather predictions supplied by databases;

measured current data acquired by means of the current meter;

streamer positioning data delivered by the measurement means associated with an acquisition and processing device; and the path of the boat.

The characteristics of these four types of data are described in greater detail below:

Weather Data

Weather predictions can come either from databases or from meteorological bulletins received over the link 55.

Databases generally provide long-term predictions (several months) of tidal currents; An example of the data format is as follows:

In this specification, the term meteorological bulletin is used both for information coming from databases and for meteorological bulletins proper.

The database B stores general parameters (containing information about the body issuing the meteorological bulletin, the time and date of the bulletin, the dates and times of the beginning and end of the prediction, the type of data that has been predicted, and the format of the data), together with the data proper.

Two families of data are to be found in the weather data (the current family and the swell family):

The data in the "current" family is characterized by a vector whose components (speed and the direction) vary with time, both for a given location and for a given depth. This type of data is usable for tidal current meteorological bulletins, for residual current forecasts (which corresponds essentially to weather current), and

| Decimal time of prediction (GMT) | Date of prediction (GMT) (dd/mm/yyy) | Time of prediction (HH:MM) | Height of waves due to tidal current (not used in the method of the invention) (m) | Normed tidal current speed (m/s) | Direction of tidal current (degrees) |
|---|---|---|---|---|---|
| 0.00 | Jan. 7, 1999 | 00:00 | 0.61 | 0.22 | 171.7 |
| 0.10 | Jan. 7, 1999 | 00:06 | 0.61 | 0.22 | 172.7 |
| 0.20 | Jan. 7, 1999 | 00:12 | 0.62 | 0.22 | 173.7 |

Meteorological bulletins relating to prediction data at shorter term (typically 36 hours) concerning currents, wind, or swell. In general, meteorological bulletins resolve the current vector into a tidal current and a residual current. An example of the data format is as follows:

to total current and wind forecasts. Storage in the database B can be performed using the following format: Longitude, latitude, depth (corresponding to a measurement point), Date, time, speed (m/s), direction (degrees), Date, time, speed (m/s), direction (degrees), Etc. (a series of successive time data items being stored

| Hours elapsed since most recent execution of bulletins generating model | Wave height due to residual current (not used in the method of the invention) (m) | Normed residual current speed (m/s) | Residual current direction (degrees) | Height of waves due to tidal current (not used in the method of the invention) | Normed tidal current speed (m/s) | Tidal current direction (degrees) |
|---|---|---|---|---|---|---|
| 00 | 0.05 | 0.03 | 141.74 | 0.12 | 0.10 | 101.65 |
| 01 | 0.05 | 0.02 | 147.19 | 0.31 | 0.13 | 148.20 |
| 02 | 0.05 | 0.03 | 147.19 | 0.43 | 0.17 | 166.80 |
| 03 | 0.05 | 0.03 | 149.74 | 0.45 | 0.18 | 177.00 |

The frequency at which these bulletins are issued is of the order of once or twice per day. The files are reformatted and if necessary processed and then stored in a database B associated with subassembly 53. Although presently-available weather prediction services cannot perform area sampling with resolution that is fine enough to distinguish a plurality of individual zones within most of the zones covered by an acquisition operation, the system can take account of the precise location of the point for which the weather prediction is performed, in order to be able to take account of possible spatial variations in weather data within a given coverage zone. Similarly, the system can take account of the depths of currents (to deduce prediction of current values by interpolation at the depths of the streamers when the predictions are given for a plurality of depths on either side of streamer depth).

in association with each measurement point), Longitude, latitude, depth (another measurement point), Date, time, speed (m/s), direction (degrees), Date, time, speed (m/s), direction (degrees), Etc.

Data of the "swell" family is derived from sea state meteorological bulletins. The data in this family is created by a vector whose components (height, direction, and frequency) vary with time for a given location. Storage in the database B can be in the following format: Longitude, latitude, date, time, height (m), period (s), direction (degrees), date, time, height (m), period (s), direction (degrees), etc. Longitude, latitude, date, time, height (m), period (s), direction (degrees), date, time, height (m), period (s), direction (degrees), etc.

Measured Current Data

This data comes from the on-board current meter (measured current) and is acquired in real time by the subassembly 51 and made available to the subassembly 53 via a computer link referenced 54 in FIG. 4. This data is stored in the database B and is used with periodicity lying in the range 1 minute (min) to 10 min. The structure of the data transferred over the link 54 is as follows:

Date, time, longitude, latitude,

Depth1 (m), speed (m/s), direction (degrees),

Depth2 (m), speed (m/s), direction (degrees),

Depth3 (m), speed (m/s), direction (degrees), Etc.

Streamer Group Drift

This data is computed in real time by the subassembly 51 and made available to the subassembly 53 by the link 54.

During real-time acquisition of positioning data relating to a profile (i.e. a line Li), the measured drift values are extracted and stored by the subassembly 53. Once the data has been imported by the subassembly 53, the measured drift values are stored in the database B.

In order to determine the drift of the groups at each point where the sound source is fired, the entire system towed by the ship is modelled as two virtual streamers S1 and S2 whose positions and shapes correspond to a mean of the set of streamers in the system.

In the widespread case where the towed system in fact comprises more than two streamers, the two virtual streamers S1 and S2 are described as follows:

for position, by the positions of the heads of the outermost streamers of the system; and for orientation by the mean of the shapes of the port streamers (for S1) and by the mean of the shapes of the starboard streamers (for S2).

More precisely, the shape of each streamer S1 and S2 is modelled by the position and orientation as measured in a horizontal plane comprising three streamer segments.

The structure of the data can be as follows:

Date, time, shot number, longitude, latitude, DXb, DYb (position of the head of S1), $\phi 1b$, $\phi 2b$, $\phi 3b$ (orientations of three segments of S1 relative to the Y direction or to north), DXt, DYt (position of the head of S2), $\phi 1t$, $\phi 2t$, $\phi 3t$ (orientations of three segments of S2).

The Path of the Ship

The path of the ship is stored continuously at some defined recurrence rate, in the following form:

Date, time, longitude, latitude, depth of water.

Definition of the Different "Current Types"

The subassembly 5" has means for responding to the imported current data (as measured or as predicted by meteorological bulletins) to define various types of current in a classification scheme devised by the Applicant:

Type 1: measured current: this is the total current as measured by a current meter;

Type 2: tidal current: this comes from meteorological bulletins, or is deduced from measurements of current by harmonic analysis;

Type 3: "tidal+weather lab residual" current: this is the sum of a tidal current plus a residual current as supplied by a weather forecasting body. The tidal current can come from meteorological bulletins, or it can be deduced from current meter measurements. The residual current comes form meteorological bulletins;

Type 4: "extrapolated future total" current: this is an extrapolation (performed by a specific predictor module integrated in the subassembly 53, whose operation is described below, and which also serves to generate the extrapolated current values required for computing current "objects" of types 5, 6, and 7), of the total current vector as measured by a current meter. Extrapolation of this current can cover the next three hours;

Type 5: "tidal+extrapolated future residual" current: this is the sum of a tidal current plus a residual current extrapolated by the predictor as described below with reference to FIG. 6. The tidal current can come from meteorological bulletins or it can be deduced from current meter measurements. The extrapolated future residual current is computed by the predictor by extrapolating current meter measurements from which tidal current has been subtracted. This current extrapolation can cover the next 3 hours;

Type 6: "extrapolated past total" current: extrapolated past current corresponds to short-term predictions (the set of all 1-hour predictions, for example) that the predictor has performed in the past. This is an extrapolation of one given term (e.g. 1 hour) of the total current vector as measured by a current meter. This current is computed between the beginning of the operation and the present instant;

Type 7: "tidal+extrapolated past residual" current: this is the sum of a tidal current plus a past residual current as extrapolated by the predictor. The tidal current can come from meteorological bulletins, or it can be deduced from current meter measurements. The extrapolated past residual current corresponds to the short-term predictions (the set of all 1-hour predictions, for example) that the predictor has made in the past. The extrapolated past residual current is computed by extrapolating measurements from a current meter that have had tidal current values subtracted therefrom for one prediction term (1 hour in this case). This current is computed between the beginning of the operation and the present instant.

Definition of 'Current Objects' by the User

The computer of subassembly 53 is provided with interface software enabling the user to create a 'current object' which the system is to process, by:

selecting a desired current type; and giving specific parameters to the 'current object', whenever creation of a 'current object' of a given type requires certain parameters to be selected.

To this end, the interface software displays a dialog box on the computer screen enabling the user:

to specify the selected current type. The user can select this type as a function of the duration of the desired prediction period (of hour order when assisting navigation in real time, of 24-hour order when assisting towing of the next profile), and also as a function of the characteristics of the currents in the zone to be covered (predominance of certain current components);

and also to create in the 'current object' system which is defined not only by type, but also by the following parameters:

the name of the 'current object';

the names of the bodies issuing meteorological bulletins or of the current meters that the user wishes to select for tidal currents, residual currents, or other types of current;

the selected depth(s). The user can select any one of the current meters declared in the system; under such circumstances, "depth" information is defined by the first and the last cells between which the user desires that the system should average current vectors;

for current types that involve past extrapolations: the prediction term; and a graphical feature making it possible subsequently to distinguish on the screen of the interface the 'current object' as defined in this way (a color or a symbol allocated to said 'current object', for example).

Depending on the type of the 'current object', all or only some of the above parameters need to be defined.

More precisely, in one implementation of the invention, in addition to the name of the 'current object', its type, and two determined depths between which the user desires the vectors representing current to be averaged, and finally the graphical features which the user desires to associate with the 'current object'; the user must also determine the parameters defined below for each respective current type:

|  | Current type number | | | | | | |
|---|---|---|---|---|---|---|---|
|  | 1 | 2 | 3 | 4 | 5 | 6 | 7 |
| Access path to data from a current meter | X |  |  | X | X | X | X |
| Current meter setting parameter(s) | X |  |  | X | X | X | X |
| Access path to tidal current data |  | X | X |  | X |  | X |
| Access path to residual current data issued by a weather laboratory |  |  |  | X |  |  |  |
| Prediction term |  |  |  |  |  | X | X |

The dialog box also enables the user to create, modify, delete, and duplicate these 'current objects' whose characteristics are stored in an associated memory location of the system.

Once the user has thus created a 'current object', it is possible while operating over a zone to use the system to:
   display variation over time in one or more desired 'current objects'. To this end, the user informs the system of the characteristics that are to be displayed on the screen, as described below. The system then computes values for the 'current object' either using a time interval that can be assessed by the user, or else the occurrence of a new event (new measurement of current, arrival of a meteorological bulletin, modification/deletion/creation of a 'current object' by the user, . . . );
   display the streamer positioning differences (the position of a streamer being defined by the X, Y, Z positions of its points as a function of time) by comparing simulated positions on the basis of 'current objects' selected by the user and measured positions;
   determining in real time the optimum track for the boat to follow; and
   optimizing the next profile to be shot by the boat.

For these four types of implementation, the system performs recurrent computations on the 'current object' involved.

In the first two types of implementation measured above, the system always displays the way the measured values vary (type 1 'current object' for the first implementation, difference between measured position and simulated position of a streamer as computed using a type 1 'current object').

Such a simultaneous display of measured values enables the user to assess the quality of the various 'current objects' that have been defined for display purposes and to select amongst them a 'current object' for one or other of the last two types of implementation.

In order to be able to compute 'current objects' based on primary currents issued by meteorological bulletins and/or the tidal current deduced from measurements of current over the zone, it is necessary to begin by specifying the particular meteorological bulletins and/or the particular tidal current file deduced from on-zone measurements of current. This is done by selecting:
   for meteorological bulletins, the forecast whose reception time has passed and which is the most recent to the instant for which a particular value is to be computed for the 'current object'; and
   for tidal current files deduced from measurements of current, the file whose creation date is past and is the most recent to the instant at which a particular value of the 'current object' is to be computed.

In addition, the way in which a 'current object' is computed depends:
   on the timing between the instant at which it is computed and the range of times for which it is computed; and
   the type of implementation that needs it to be computed.

More precisely, three situations can arise:
   the situation in which the instant at which the system performs the computation of a 'current object' is after the time range for which the 'current object' is computed; in this case, the position of the ship as a function of time is known, and for each instant in the time base of the 'current object' interpolation is performed in space and in time between the current vectors of the primary current(s) used for constructing the 'current object';
   when the instant at which the system computes the 'current object' is earlier than the range of time for which the computation is performed; in this case, the position of the ship as a function of time is:
      either unknown, for implementations of the type in which variation over time of 'current object' is displayed. In this case, the values of the 'current object' are computed by requiring the future position of the ship to be equal to the position of the ship at the time at which the computation is performed. Interpolation in space is therefore the same for all of the instants in the time base of the 'current object';
      or else assumes, for implementations of the 'real-time determination of optimum track' and 'optimization of next profile' types. This case reduces to the case mentioned above and for each instant in the time base of the 'current object', interpolation is performed in space and in time between the current vectors of the primary current(s) used for constructing the 'current object';
   the case when the instant at which the system computes the 'current object' lies within the range of times for which it is computed; in this case, two subranges of time are taken into consideration, one subrange being earlier than the instant at which computation is performed and the other being subsequent to the instant of computation, and depending on which one of these two subranges contains the instant for which a particular value of the 'current object' is computed, the computation reduces to one or other of the two kinds mentioned above.

Display of Currents and Drifts

This applies to the first two types of implementation of the invention while operating on zones.

The interface of the subassembly 53 serves to display in the form of curves not only the track of the ship, but also the currents as measured and/or predicted, and the differences of streamer positioning as measured and as simulated. Comparing the measured and predicted values enables the user to assess in real time the quality of the predictions, and possibly to select the most suitable 'current object' if the present performance is judged to be inadequate.

Graphs of Predicted and Measured Currents

These graphs are representations of a plurality of curves that are superposable as a function of time, together with a zoom option. A dialog box enables the user to create, modify, delete, and duplicate these graphs. They are defined by:

the dates and times at the beginning and end of a graph;

a filter box for selecting the 'current objects' to be shown;

an ideal Y direction for the profiles;

the vector to be shown;

the 'current objects' to be used;

the projection of the speed of the current relative to the defined direction;

the projection of the speed of the current relative to X perpendicular to the defined Y direction; and the same curves but after filtering has been applied thereto (sliding average, standard deviation, . . . ).

The graph is redrawn each time the system recomputes one of the 'current objects' selected for the graph. The times on the graph are derived from the time differences applicable to current meter acquisition. A plurality of graphs can be shown simultaneously.

Graph of Differences and Drifts

The purpose of this graph is to show the lateral difference from a curvilinear abscissa of length 1000 m between the measured positions of the streamers and a simulation of the positions of the streamers using a 'current object' as selected by the user. The graph will be in the form of a plurality of curves that are superposable as a function of time with a zoom option. The graph can extend from the beginning of operations up to the present instant.

The user defines the graphs. A dialog box enables the user to create, modify, delete, and duplicate these graphs. They are defined by:

the dates and times at the beginning and the end of a graph; and a filter box enabling 'current objects' to be selected for use in computing simultaneous drifts, the object being selected from objects of types 1, 2, 3, 6, and 7.

The graph is redrawn after each profile. The time intervals of the graph are derived from the time differences of the profiles. A plurality of graphs can be shown simultaneously.

Predictions of Current at Very Short Term

The system devised by the Applicant for implementing the method of the invention comprises, as mentioned above, a short-term prediction of current module (which module is generally referred to as a "predictor"), that the system runs whenever it is necessary to compute a 'current object' of type 4, 5, 6, or 7.

These short-term predictions are produced in real time and they are used essentially for providing navigational assistance in real time and for displaying 'current objects' and positioning differences between a real streamer and a stimulated streamer. Predictor characteristics are described below for the case where input data is in the form of values as measured for current up to the instant of prediction.

This linear predictor is required at an instant t to produce an estimate of the current at a future instant t+T0, on the basis solely of a time series of current data measurements performed in situ up to the instant t (e.g. by current meters previously moored in the zone or on board the ship).

This predictor considers measured current data acquisition as a second order non-centered steady random process. The predicted current is the result of applying linear filtering to the available measured data.

The components of the filter are deduced by solving a system of linear equations that in turn is the result of minimizing error variation performed on the predicted value.

In outline, the predictor operates as follows:

Given measurement of current U(i) for i=1 to P, it is desired to produce the best estimate of current $\hat{U}(P+T0)$ from U up to the instant P+T0.

To do this, it is initially assumed that the current U is a second order non-centered steady process, and the following notation is adopted:

$$U_P = \begin{pmatrix} U(P) \\ U(P-1) \\ \vdots \\ U(1) \end{pmatrix} \quad U_{P+T0} = \begin{pmatrix} U(P+T0) \\ U(P) \\ U(P-1) \\ \vdots \\ U(1) \end{pmatrix}$$

The estimate $\hat{U}(P+T0)$ is the result of applying linear filtering to $U_P$, i.e. is the scalar product of a vector $C_p$ of dimension P multiplied by $$U_p; \hat{U}(P+T0) = c_P^T U_p$$

Let e(P+T0) be the difference between U(P+T0) and its estimated value $\hat{U}(P+T0)$. The mathematical expectation can then be computed:

$$E[e(P+T0)] = E[U(P+T0) - \hat{U}(P+T0)]$$
$$= E[U(P+T0) - c_P^T U_p]$$
$$= a^T E[U_{P+T0}]$$

In this computation, a vector a is used of dimension P+1, on the implicit assumption that its first component is of value 1.

Estimation is based on the principle of minimizing error variance under the following constraints:

the mean error must be zero; and the first component of the vector is equal to 1.

Mathematically, the parameters a1, a2, . . . , aP+1 are determined that minimize the relationship:

$$G = E[(e(P+T0) - E[e(P+T0)])^2]$$
$$= a^T \Gamma_U a$$

with the following constraints:

$$aE[U_{P+T0}] = 0 \quad (1)$$

and $$a1 = 1 \quad (2)$$

The matrix $\Gamma_u$ is written:

$$\Gamma_U = \begin{pmatrix} \gamma_0 & \gamma_{T0} & \gamma_{T0+1} & \gamma_{T0+1} & \cdots & \gamma_{P+T0-1} \\ \gamma_{T0} & \gamma_0 & \gamma_1 & \gamma_2 & \cdots & \gamma_{P-1} \\ \gamma_{T0+1} & \gamma_1 & \gamma_0 & \gamma_1 & \ddots & \vdots \\ \gamma_{T0+2} & \gamma_2 & \gamma_1 & \gamma_0 & \ddots & \gamma_2 \\ \vdots & \vdots & \ddots & \ddots & \ddots & \gamma_1 \\ \gamma_{P+T0-1} & \gamma_{P-1} & \cdots & \gamma_2 & \gamma_1 & \lambda_0 \end{pmatrix}$$

$\gamma_i$ being the autocovariance function of U.

U is assumed to be steady so its expectation does not vary over time. Thus:

$$E[U_{P+T0}] = \begin{pmatrix} E[U(P+T0)] \\ E[U(P)] \\ E[U(P-1)] \\ \vdots \\ E[U(1)] \end{pmatrix} = cte \cdot \begin{pmatrix} 1 \\ 1 \\ 1 \\ \vdots \\ 1 \end{pmatrix}$$

Condition (2) thus becomes:

$$\sum_{i=1}^{P+1} a_i = 0$$

and the problem then amounts to minimizing:

$$G = \left(1 - 1 - \sum_{i=3}^{P+1} a_i a_3 \cdots a_{P+1}\right) \Gamma_U \begin{pmatrix} 1 \\ -1 - \sum_{i=3}^{P+1} a_i \\ a_3 \\ \vdots \\ a_{P+1} \end{pmatrix}$$

To minimize G, its gradient is said to be zero $$\left(\frac{\partial G}{\partial a_i} = 0 \text{ for all } i \text{ in the range 3 to P+1}\right),$$

for all i in the range 3 to P+1), thus providing P−1 equations. After computation, the following system is obtained:

$$\text{Amat}_{(P-1;\ P-1)}\ U\text{sol} = \text{vect}$$

where $\text{Amat}_{(P-1;\ P-1)}$ is symmetrical with Amat(i, j)=$\gamma_{|j-i|}$−$\gamma_j$−$\gamma_i$+$\gamma_0$ $$\text{vect}(i) = \gamma_{T0} - \gamma_{T0+1} + \gamma_1 - \gamma_0$$

and $$U\text{sol} = \begin{pmatrix} a_3 \\ a_4 \\ \vdots \\ a_{P+1} \end{pmatrix}$$

Solving the system of P-1 equations gives the vector a, whose last P components are used for computing equation.

In practice, the function of the predictor is performed by executing a computer program. This program requires input in the form of a measured current data series sampled at an interval dt.

After reading the values, the program performs prediction for each time step nt=ndt. To do this, having the n preceding current values, the program computes the statistical elements necessary for computing an autocorrelation function of these n values, and subsequently for establishing the linear system of equations to be solved.

By solving the system, the program produces a prediction for the current at nt+T0.

It should be observed that the number n of past measurements used for computing the autocorrelation function can be adjusted. The program also gives weights to the n measurements of the input series that are inversely proportional to their age, so as to anticipate sudden changes due to the residual current (corresponding to the weather current) when computing expectations necessary for obtaining the autocorrelation function.

In order to stabilize the predictions from the predictor and avoid deviant values, the Applicant has also implemented a method of conditioning the linear system to be solved. In this respect, it is advantageous to use a descent method and more particularly the conjugate gradient method.

Figure 5A:
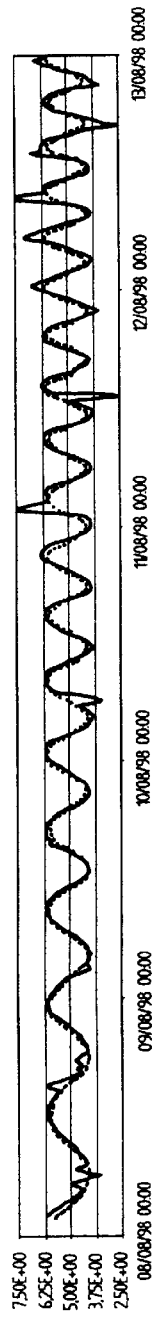
FIGS. 5a to 5d set out the various results of predictions of current implemented in the invention.
Figure 5B:
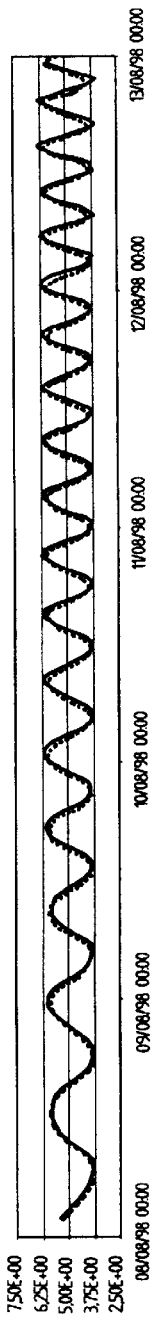
Figure 5C:
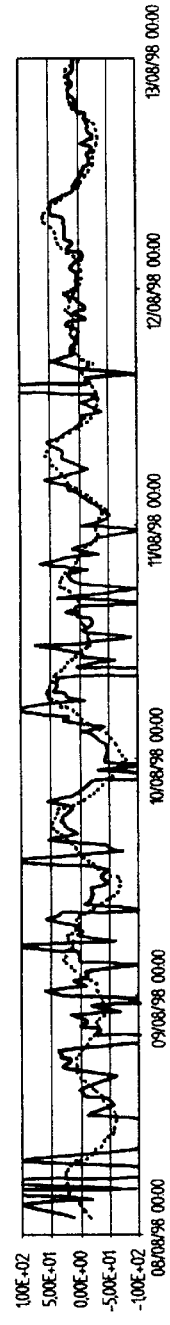
Figure 5D:
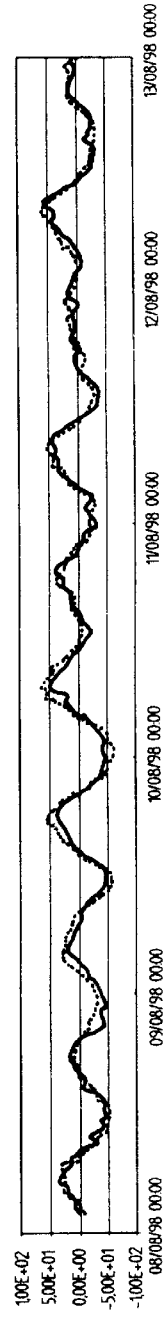

FIGS. 5a to 5d show comparisons between measurements of current and predictions P performed by the predictor module whose linear system was solved by a Gaussian method (FIGS. 5a and 5c) and predictions performed by the conjugate gradient method (FIGS. 5b and 5d). It can be seen that the deviant values produced by the Gaussian method disappear when using the conjugate gradient method. In addition this method turns out to be beneficial in terms of computation time.

To evaluate the performance of the linear predictor, i.e. the difference between the predicted current and the measured current (where an acceptable error can be set at a value of about 2 centimeters per second (cm/s) or even more), the Applicant has also made use of:

two main criteria:
the mean of the absolute value of the difference between the prediction and the measurement, written "abs error"; and
the difference between the prediction and the measurement below the value for which 90% of the prediction points are to be found; this difference is written "(90% difference)";
the system also computes the average of the difference between the prediction and the measurement in order to show up any possible bias.

The table below shows 90% error and absolute error for prediction ranges of 1 hour to 3 hours, the rows of the table corresponding to different conditions for performing in situ measurement of current. Thus:

the first three rows of the table correspond to the performance of prediction performed on the basis of "S4" type current meters moored at various different points B, E, L, and N in a zone, while row S4 represents the mean of the performances in the first three rows; and
the row ADCP corresponds to performance relating to measurements coming from an "acoustic Doppler current profiler" type instrument on board a ship operating in the North Sea at a speed of 10 knots.

| | 90% difference (cm/s) | | | | | abs erreur (cm/s) | | | | |
|---|---|---|---|---|---|---|---|---|---|---|
| Ranges | 1 h | 1.5 h | 2 h | 2.5 h | 3 h | 1 h | 1.5 h | 2 h | 2.5 h | 3 h |
| B | 4.16 | 5.49 | 6.61 | 7.44 | 8.05 | 1.97 | 2.62 | 3.16 | 3.56 | 3.84 |
| E | 8.52 | 11.07 | 13.11 | 14.60 | 15.59 | 3.99 | 5.20 | 6.21 | 6.89 | 7.32 |
| L, N | 5.29 | 7.08 | 8.71 | 10.06 | 11.04 | 2.51 | 3.38 | 4.19 | 4.86 | 5.35 |
| S4 | 6.14 | 8.06 | 9.61 | 10.76 | 11.54 | 2.90 | 3.82 | 4.58 | 5.12 | 5.48 |
| ADCP | 8.97 | 13.81 | 17.92 | 21.71 | 24.62 | 3.82 | 6.09 | 8.13 | 9.81 | 11.14 |

It can be seen:

that for short-term prediction (to a horizon of about 1 hour and less) the absolute error is generally acceptable;

that there exists quite large disparity concerning the 90% difference criterion, and that its level is also higher; and that the prediction performance when compared with ADCP measurement is significantly less good than when compared with current meters moored at fixed locations.

The Applicant has found that the errors that result from comparisons between predictions and ADCP measurements come essentially from the size of the very large geophysical zone covered by the ship associated with the ADCP.

When taking measurements, the ship was traveling in coastal zones and also in zones out at sea, and current conditions are different in those two types of zone.

The performance of the predictor increases with implementation on steady current conditions, in that a stable trend emerges over a plurality of consecutive measurement points.

The Applicant has thus integrated an improvement in the predictor for showing up a harmonic portion in the in situ measured current, which harmonic has easily predictable regular behavior, thus enabling this harmonic portion to be subtracted from the total current and enabling the linear predictor to be applied to the residual portion of the current (i.e. the in situ measured current from which the harmonic portion has been subtracted).

It will be understood that, for example when a current has a large tidal component, the residual amplitude must be significantly smaller than that of the total current so that the prediction error as measured using the above-described criteria is decreased when compared with total current.

The general procedure of this processing is shown diagrammatically in FIG. 6. After in situ measurement of the current between an instant nt0 in the past and an instant nt (step 701), a harmonic current is determined that is assumed to be the tidal current (step 702), and then at 703 this tidal current is subtracted from the total measured current in order at 704 to obtain a residual current between the instants nt0 and nt (which current is by its very nature non-harmonic).

Thereafter, this residual current is processed by the linear predictor at 705 to produce a predicted residual current at a future instant nt+T0. Subsequently at 707, this predicted residual current is added to the tidal current as predicted at 708 for instant nt+T0, where this prediction is deterministic. The result of this addition is used in 709 as a prediction of the total current at nt+T0.

To obtain the harmonic tidal current, it is possible to use a finite element digital model based on a grid of the surveyed zone by supplying limit conditions on the basis of the results of a larger scale model or of in situ measurements, or indeed by performing harmonic analysis.

Such harmonic analysis can be performed by the procedure outlined in FIG. 7. The process shown in this figure is analogous to that described above:

step 802 corresponds to computing the tidal current after a harmonic analysis step 801 in which the main tides contained in the current measured at 800 are determined. This step leads to the equivalent of above-described step 702;

step 808 corresponds to above-described step 708. To predict the tidal current, tides are extrapolated (see below for an explanation of how tides are determined).

The Applicant has used such analysis on real current data covering periods of 5 months for current meter B and 3 months for current meter E.

To perform harmonic analysis, the system begins by applying Fourier analysis to the data series in order to identify peaks in the frequency spectrum of the data that correspond to the main known tide-generating waves (these waves being listed, for example, in the work "Introductory dynamical oceanography" by Pond and Pickard, where the main waves are semi-diurnal (waves M2, S2, N2, K2), diurnal (waves K1, O1, P1, Q1) or of long period (Mf, Mn, Ssa)).

It is thus possible to extract the main harmonic components from the total current and the results of the procedure described with reference to FIGS. 6 and 7 are summarized in the table below, from which it can be seen there is a very significant improvement in the quality of prediction.

| | 90% difference (cm/s) | | | abs erreur (cm/s) | | |
|---|---|---|---|---|---|---|
| Ranges | 1 h | 1.5 h | 2 h | 1 h | 1.5 h | 2 h |
| B | 2.64 | 3.97 | 5.16 | 1.25 | 1.90 | 2.46 |
| E | 5.30 | 7.62 | 9.39 | 2.42 | 3.52 | 4.32 |

It will be understood that in operation it is necessary to have a history of measurements of current in order to be able to perform such harmonic analysis which will also be performed on a periodic basis (about once per day).

In general, semi-diurnal waves of type N2 are preponderant in tidal harmonic components. In practice, it turns out that after the end of an initial on-site current measuring period of one to several days, the system has sufficient history to extract more significant harmonic components from the measurements of current.

Optimizing the Track of the Ship In Real Time

There follows a description of the general principles and the stages in computing an optimum track for the ship in real time, thus constituting the third type of implementation of the invention during on-zone operations. This type of implementation makes use of an algorithm for seeking the optimum track.

In this case, the current data used is short-term prediction data as selected by the user from above-defined types 2, 4, and 5 as delivered by the above-described predictor module.

The purpose of this optimization is to provide the navigator at some given repetition rate with an optimum track to follow, i.e. the optimum position for the ship as a function of time, said optimum track possibly being provided directly by the subassembly 53 to the automatic pilot system of the ship.

On the basis of short-term predictions of current from the predictor, and using the hydrodynamic cable deformation model, coverage optimization amounts to finding the track to be given to the head of the streamer, i.e. to the ship, so that future CMPs are offset by the width of one cell in the X direction sideways from the preceding profile.

In a simplified version it can be assumed that the system (ship; streamer head) is not deformable. This assumption can be dropped by implementing a hydrodynamic model that is capable of computing the dynamic deformations to which this system is subject, and to do so fast enough to be compatible with the algorithm for computing the optimum track as described below.

Navigation Algorithm

The navigation algorithm described below is used for the following three applications of the invention: "real-time navigation"; "preparing the next profile"; and "preparation and study".

In this part we begin by defining the following notation relating to the adjacent profile (i.e. the profile for which data is known):

($Xa_{i,k}$, $Ya_{i,k}$) the coordinates of the various points of the outer streamer along the adjacent profile. Below, index "a" relates to data for the adjacent profile, index "i" relates to shot number, and index "k" relates to the various points along a streamer (the curvilinear abscissa constituted by the streamer being made discrete). By convention, k=1 corresponds to the head of the streamer and k=K corresponds to the tail of the streamer.

The following notation is defined relating to the reference streamer (i.e. the "virtual" streamer which it is desired to match), with this streamer being obtained by shifting the streamer points of the preceding profile by translation in the X direction while remaining at the same level (same Y), and also possibly an associated set of rotations all through an identical angle centered on the head of the streamer at each shot point. In conventional manner, the translation corresponds to an offset of one bin across the CMP line closest to the profile to be optimized, but the method covers the possibility of modifying this distance. The angle of rotation is conventionally zero, but the method covers the possibility of including some other angle.

($Xc_{i,k}$, $Yc_{i,k}$) the coordinates of the various points along the reference streamer on the profile to be optimized. The index "c" is used below to mean "reference".

The following notation is defined for the known parameters associated with initial conditions of optimization. The initial instant corresponds, for example, to the current instant when performing real-time optimization, and to various acceptable instants for the beginning of a profile when optimizing the next profile:

($X0_k$, $Y0_k$): the coordinates of the various points of the streamer. In a "present profile" application, all of these points are known, and they are transmitted to the system via the positioning measurement device. In a "next profile" application, only $YO_1$ is known (i.e. the Y component for the head of the streamer and the first shot on the portion of track to be optimized). In this case, the shape of the streamer is estimated by making assumptions concerning the speed of the ship, and $X0_1$ becomes an unknown of the problem;

t0: the initial instant of the optimization.

The following notation is used for predictions of current:

($cx_{j,Ix,Iy,Iz}$, $Cy_{j,Ix,Iy,Iz}$): the components of the current at instants subsequent to t0. Index "j" corresponds to the series of instants relating to predictions of current. The indices "Ix", "Iy", "Iz" correspond to the coordinates in three spatial dimensions of points of the ocean for which predictions of current are available.

The following notation is also defined relating to the optimum track:

($X1_{i,k}$, $Y1_{i,k}$): the coordinates of the various points of the outer streamer along the portion of profile being studied when the ship follows the optimum track. The series $Y1_{i,1}$ (i.e. the successive Y coordinates of the streamer head) is known and coincides with the series $Yc_{i,1}$. The series $X1_{i,1}$ (i.e. successive X coordinates of the streamer head) is an unknown of the problem. The series ($X1_{i,k}$, $Y1_{i,k}$) for which "k" is different from 1 are the result of the hydrodynamic model of streamer deformation;

$t1_i$ is the series of shot instants corresponding to the optimum track. It is an unknown of the problem.

The following notation is also defined associated with weighting the distance between the reference streamer and the streamer associated with the optimum track as a function of the curvilinear abscissa of the point under consideration of the streamer ("offset class"):

$P_k$ is the weight to be associated to the difference between the reference streamer and the streamer associated with the optimum track as a function of the offset class of the point of index "k" in each of the two streamers.

The function to be minimized must be a norm of the difference between the reference streamer and the simulated streamer along the portion of profile that is to be optimized. By way of example, this function can be expressed in the following various mathematical forms:

$$H(X1_{i,1}, t1_i) = \sum_{i=i0}^{I} \sum_{k=1}^{K} |Xc_{i,k} - X1_{i,k}| P_k$$

$$H(X1_{i,1}, t1_i) = \sum_{i=i0}^{I} \sum_{k=1}^{K} P_k \sqrt{(Xc_{i,k} - X1_{i,k})^2 + (Yc_{i,k} - Y1_{i,k})^2}$$

i0 and I being respectively the numbers of the first and the last firing points on the track to be optimized.

Several methods can be envisaged for optimizing this function. There follows a description of one possible solving scheme based on seeking an optimum path in a graph. In contrast with the term "track" which designates a series of geographical points that vary in time, the term "path" is used to designate a particular path through the optimization graph. This particular solving scheme consists in:

initially defining a three-dimensional graph having two dimensions representing geographical coordinates and a third dimension representing time between two consecutive planes Y=Yn and Y=Yn+1;

simulating variation of the streamer as a function of all of the paths that can be taken by the streamer head within the graph; and selecting the track ($X1_{i,1}$, $Y1_{i,1}$, $t1_i$) for which the function $H(X1_{i,1}, t1_i)$ is minimized.

Defining the Optimization Graph

We begin by defining the directions associated with the three dimensions of the graph. Thereafter, index "g" designates the coordinates and the coordinate axes of the optimization graph. The geographical dimensions Xg and Yg of the graph are parallel to and in the same direction as the corresponding axes X and Y used throughout this specification. Thus, in the optimization graph, Yg is parallel to the general direction of the tracks followed by the ship, and Xg is perpendicular thereto. The time dimension ΔTg is a time difference or going from a plane Yg=Yg$_n$ of the graph to the next following plane Yg=Yg$_{n+1}$.

The following notation is also defined, associated with the discrete character of the three axes of the optimization graph:

ΔXg and ΔYg are the distances between two consecutive planes of the graph in the distances Xg and Yg respectively. ΔXg is an optimization parameter to be entered by the user;

Δtg is the time step between two consecutive planes of the graph in the direction ΔTg; and NXg, NYg, and NTg are the numbers of points of the graph in the respective directions Xg, Yg, and ΔTg.

The following notation is also defined relating to optimization parameters to be defined by the user:

Vmin and Vmax are minimum and maximum speeds for the head of the streamer;

φmax is the maximum difference between the heading of the streamer head and the bearing of the ideal direction for the profiles; and Xgmin, Xgmax are the minimum and maximum limits of the streamer head along the Xg direction.

Using this notation, the following relationships apply:

$$\Delta Yg = \frac{\Delta Xg}{\tan(\varphi max)}$$

$$\Delta Tg_1 = \frac{\Delta Xg}{\sin(\varphi max) \cdot Vmax}$$

$$\Delta Tg_{NTg} = \frac{\Delta Xg}{\tan(\varphi max) \cdot Vmin}$$

$$\Delta tg = \frac{\Delta Tg_{NTg} - \Delta Tg_1}{NTg - 1}$$

The Yg axis of the graph has as its first point Yg$_1$ the point which corresponds to the coordinate Yc$_{i0,1}$ of the portion of profile to be optimized, and as its last point it has the point of coordinate Yg$_{NYg}$ such that Yg$_{NYg}$≦Yc$_{I,1}$ and Yg$_{NYg}$+ΔYg>Yc$_{I,1}$.

The Xg axis of the graph has as its first point Xg$_1$ the point of coordinate Xgmin entered by the user and as its lasts point the point of coordinate Xg$_{NXg}$ such that Xg$_{NYg}$≦Xgmax and Xg$_{NXg}$+ΔYg>Xgmax.

The axis ΔTg of the graph has as its first and last points the points whose respective coordinates ΔTg$_1$ and ΔTg$_{NTg}$ are given by the above relationships.

In addition, notation relating to the projection of the reference streamer coordinates (Xc$_{i,k}$, Yc$_{i,k}$) on the optimization graph:

(Xcg$_{ig,k}$, Ycg$_{ig,k}$) the coordinates of the various, points of the reference streamer along the profile to be optimized. The head of this "grid reference streamer" is included in the plane Yg=Yg$_{ig}$. It should be observed that the coordinate Xcg$_{ig,1}$ of the head of the "grid reference streamer" is almost certainly not included in the Xg plane of the optimization graph.

The projection of the reference points (Xc$_{i,k}$, Yc$_{i,k}$) on the optimization graph is performed by linear interpolation based on the two Yc coordinates of the reference streamer head of the shot points numbered i and i+1 on either side of a plane Yg$_{ig}$, i.e.:

$$Xcg_{ig,k} = \frac{(Yg_{ig} - Yc_{i,1})(Xc_{i+1,k} - Xc_{i,k})}{(Yc_{i+1,1} - Yc_{i,1})}$$

$$Ycg_{ig,k} = \frac{(Yg_{ig} - Yc_{i,1})(Yc_{i+1,k} - Yc_{i,k})}{(Yc_{i+1,1} - Yc_{i,1})}$$

The examples of the functions to be minimized as expressed above in terms of coordinates relating to shot point number, are expressed in terms of indices ixg and itg of the optimization grid as follows:

$$H(ixg_1, ixg_2, \ldots, ixg_{NYg}, itg_1, itg_2, \ldots, itg_{NYg}) = \sum_{ig=1}^{NYg} \sum_{k=1}^{K} |Xcg_{ig,k} - X1g_{ig,k}| P_k$$

$$H(ixg_1, ixg_2, \ldots, ixg_{NYg}, itg_1, itg_2, \ldots, itg_{NYg}) = \sum_{ig=1}^{NYg} \sum_{k=1}^{K} P_k \sqrt{(Xcg_{ig,k} - X1g_{ig,k})^2 + (Ycg_{ig,k} - Y1g_{ig,k})^2}$$

Simulation of Streamer Variation as a Function of the Different Possible Paths and Selection of the Optimum Track The possible paths within the above-defined optimization graph have the following constraints:

the Y1g coordinate of the first point(s) of the path(s) is Yg$_1$;

in the "real-time track optimizing" application, the X1g coordinate of the first path point is such that its ixg index minimizes the distance |X1g$_1$−Xcg$_{1,1}$|;

in the "next profile" application, there are NXg starting points corresponding to the NXg point of the grid Xg; and starting from a point having indices (ixg$_{ig}$, itg$_{ig}$) in the plane Yg$_{ig}$, it is possible to access points having indices (ixg$_{ig+1}$, itg$_{ig+1}$) in the plane Yg$_{ig+1}$, such that: ixg$_{ig+1}$=min(NXg, ixg$_{ig}$+1) or ixg$_{ig+1}$=ixg$_{ig}$ or ixg$_{ig+1}$=max(1, ixg$_{ig}$−1) and itg$_{ig+1}$=min(NTg, itg$_{ig}$+1) or itg$_{ig+1}$=itg$_{ig}$ or itg$_{ig+1}$=max(1, itg$_{ig}$−1)

The graph is explored as follows:

an arbitrary "cost" (i.e. value of the function H to be minimized) of zero is given to the starting point(s), i.e. H_total(ixg$_1$, itg$_1$)=0;

all paths starting from a plane Yg$_{ig}$ and going to the following plane Yg$_{ig+1}$ are simulated;

for all of these paths, an individual cost is computed, e.g. expressed as follows:

$$H\_uni(ixg_{ig}, itg_{ig}; ixg_{ig+1}, itg_{ig+1}) = \sum_{k=1}^{K} |Xcg_{ig,k} - X1g_{ig,k}| P_k$$

for each arrival point in the plane Yg$_{ig+1}$, the path is selected for which H_total(ixg$_{ig}$, itg$_{ig}$)+H_uni(ixg$_{ig}$, itg$_{ig}$; ixg$_{ig+1}$, itg$_{ig+1}$) is a minimum, and this value is given to H_total(ixg$_{ig+1}$, itg$_{ig+1}$); and on reaching the last plane Yg$_{NYg}$, the arrival point is selected which as the minimum value for H_total (ixg$_{Nyg}$, itg$_{NYg}$).

Amongst other advantages, this method of exploring the graph presents the following three major advantages:

since the number of possible paths has been made finite and countable, a solution is indeed found and this solution is the optimum path;

on reaching each new plane $Yg_{ig+1}$, the method eliminates a large number of potential paths (in application of the theorem whereby "every subtrack of an optimum track is optimum"), thus making the method easy to apply using present computer means for computation; and the search for the optimum track is performed sequentially, thereby making it possible to stop computation at any moment and still obtain a solution which is an optimum solution between the plane $Yg_1$ and the plane $Yg_{ig}$ at which computation was stopped.

Optimization of the Next Profile to be Surveyed by the Ship

This constitutes the fourth type of implementation of the invention for on-zone operations.

During a mission, the next profile to be shot is determined relative to one of the profiles that has already been acquired and to which the profile that is to be shot will be adjacent. The main objective in this second main application of the invention is to determine the next profile and the time of the first shot of the sound source for said profile so as to obtain streamer drift that is as similar as possible to the drift in the adjacent profile.

The methods and computation modules described above for providing real-time assistance in navigation are also implemented in this optimization. Nevertheless, medium-term application has features that are specific thereto, since:

more time is available for computing the optimum track (the prediction term is now of half-day order);

however, since the term is more remote from the moment at which prediction is performed, uncertainty is greater concerning current; and finally, in this case the system is not content merely to compute an optimum track portion, but must compute the optimum track along the entire length of the profile for each profile given by the user and for each starting instant for which the user has defined the minimum and maximum limits for each profile.

As mentioned above, in order to minimize infills, it is necessary for the streamer drifts to be parallel when passing through the same Y ordinate on the optimization grid on two adjacent profiles. The optimization criterion is thus to minimize the weighted area between the streamer of the adjacent profile that has already been carried out and the shape of the streamer predicted for the next profile.

FIG. 11 illustrates this objective. In FIG. 11, the left-hand portion shows two adjacent profiles 121 and 122 where it can be seen that the streamers do not have the same orientation when passing through the same Y ordinate; this configuration is not optimum and it generates coverage holes.

In the right-hand portion of the figure, the streamers S1 and S2 are parallel for the profiles 123 and 124, with the profile 124 being optimized to provide a "best match" to the adjacent profile 123 which has already been carried out.

An optimization criterion is defined and is illustrated in FIG. 12; it is computed for each plane Y=a constant in the optimization grid and it is proportional to the weighted area between the reference streamer and the simulated streamer.

The sum of the individual areas for all of the points of intersection between the head of the "reference" streamer and the planes Y=a constant of the optimization grid of a profile to be shot is computed in such a manner as to evaluate the optimization ratio of a given prediction.

Thus, for a given predicted profile, a value is available for an optimization criterion that makes it possible to predict the quality of the coverage that ought to be associated with the profile.

For each profile given by the user and for each starting instant for which the user has defined a time window in terms of minimum and maximum limits, the program determines the optimum track and deduces therefrom the associated starting instant and optimization criterion.

The program makes it possible:

to select the candidate adjacent next profile and profile ends if the next profile does not have the same limits, in the Y direction for the shot point as the adjacent profiles;

to select the 'current object' with which the predicted drift is to be computed (in this application, from objects of types 2 and 3);

to define a time window in which it is possible to begin the next profile (a utility in the subassembly 53 making it possible to select one or more future profiles and to compute this information); and to input general parameters and parameters relating to configuring the computation.

The program displays its results and stores them in memory. For each proposed profile and for each time for the first shot, storage will comprise:

the value of the optimization criterion described with reference to FIG. 12;

the optimum date and time for the first shot point;

the optimum speed and position of the boat at the first shot point; and the number of shot points to which optimization applies compared with the number of shot points of the next profile.

FIG. 13 shows the appearance of the displayed results of variation in the optimization criterion as a function of time for three profiles 141, 142, and 143.

The user also has the possibility:

of selecting a set {profile; starting time} and displaying its characteristics (value of the criterion; position and speed at the first shot point; number of shot points used, . . . ); and of selecting a set {profile: starting time} and then storing the theoretical profile together with its drift for display on the coverage chart.

Long-Term Application

The system described above can be implemented as mentioned in real-time applications or medium-term applications for providing assistance in navigation for a ship. It can also be implemented in a third application of the invention for executing another method for the purpose of predicting performance in terms of coverage associated with a given bin grid prior to undertaking a projected acquisition operation.

For this type of application, the current data used relates to long-term components of the current, i.e. to the tidal current and to general currents; in any event, the unsteady components of the current, i.e. components whose physical characteristics vary in the short term (typically the weather current that results in particular from interaction with the wind) are excluded from this long-term application.

The idea here is to evaluate in advance performance in terms of coverage associated with a given zone (i.e. to evaluate rates of undercoverage and overcoverage).

To perform such evaluation, the following can be made available:

an ideal acquisition direction;

a set of ideal rectilinear profiles;

geometrical and mechanical characteristics of the acquisition apparatus; and optionally the period during which it is proposed to perform data acquisition.

Pertinent current measuring data is also available (tidal current and general currents for the zone). In the absolute, and in the absence of any specified acquisition period, the measured current data comprises only the above-mentioned long-term components of the current.

When an acquisition period is specified, other current components that vary in the medium term can be taken into consideration if the time interval between the moment of evaluation and the beginning of the acquisition period is short.

As mentioned above, it is thus possible to evaluate performance in terms of coverage for a set of given ideal profiles by computing the optimization criterion described with reference to FIG. 12 for said set of profiles.

In a variant of this method, it is also possible to use as input data the general orientation Y of the profiles to be shot, together with measured current data for the zone, and on the basis of a first rectilinear ideal profile to implement a simulation that reproduces the computation steps described with reference to providing real-time assistance in navigation so as to determine a set of paths that take account of the mean measured current in the zone and that correspond to an optimized coverage fraction.

What is claimed is:

1. A method of simulating the positioning of a streamer towed by a ship during an operation of acquiring geophysical data at sea, said acquisition operation making use of shots from at least one sound source, the method implementing a hydrodynamic model of interaction between marine current, a path of the ship, and the streamer, the method being characterized in that it includes determining variations in the current over time and in space.

2. A method of simulating streamer positioning according to claim 1, characterized in that the method comprises:
   receiving primary current values as measured and/or predicted;
   defining vector fields or 'current objects' of respective types corresponding to different representations of the current and built up from said primary current values; and
   selecting a 'current object' as a function of the intended application.

3. A method of simulating streamer positioning according to claim 2, characterized in that 'current object' selection takes account of proximity in time between the instant for which the prediction is made and the instant at which prediction is performed.

4. A method of simulating streamer positioning according to either claim 2 or claim 3, characterized in that 'current object' selection takes account of correlation between earlier 'current object' predictions and measurements of current performed at the instants for which said earlier predictions were made.

5. A method of simulating streamer positioning according to any one of claims 2 to 4, characterized in that the coordinates of at least some 'current objects' comprise values measured on site.

6. A method of simulating streamer positioning according to any one of claims 2 to 5, characterized in that the coordinates of at least some 'current objects' comprise extrapolated values predicting current.

7. A method of simulating streamer positioning according to claim 6, characterized in that some 'current objects' are computed by using a predictor filter enabling a current data series to be extrapolated from measurements of current made in the acquisition zone.

8. A method of simulating streamer positioning according to claim 7, characterized in that the defined types of 'current object' comprise the following types:

1) total current as measured by a current meter;
2) tidal current as derived from meteorological bulletins, or as deduced from measurements of current by harmonic analysis;
3) the sum of a tidal current plus a residual current, said tidal current being derived from meteorological bulletins or being deduced from measurements of current by harmonic analysis, and said residual current being taken from meteorological bulletins;
4) an extrapolation from total current as measured by a current meter;
5) the sum of a tidal current and a computed residual current, said tidal current being taken from meteorological bulletins or being deduced from measurements of current by harmonic analysis, and said residual current being obtained by subtracting said tidal current from the current measured in the acquisition zone;
6) a history of past extrapolations of the total current as measured by a current meter; and
7) the sum of a tidal current and a history of past extrapolations of a series of values constituted by the total current as measured by a current meter from which a tidal current has been subtracted, said tidal current being taken from meteorological bulletins or being deduced from measurements of current by harmonic analysis.

9. A method of simulating streamer positioning according to claim 8, characterized in that while computing 'current objects' of types 4, 5, 6, or 7, the processed data series is considered as a second order non-centered steady random process.

10. A method of simulating streamer positioning according to either claim 8 or claim 9, characterized in that while computing values of a 'current object' of type 4, 5, 6, or 7, weights are given to the measurements of the data series for extrapolation, which weights are inversely proportional to their age, for the purpose of anticipating sudden changes due to the residual current.

11. A method of simulating streamer positioning according to any one of claims 8 to 10, characterized in that while computing a particular value of a 'current object' of type 4, 5, 6, or 7, a variance function of the difference between the predicted value and the exact value of the current or the residual current at the instant for which the prediction was computed is minimized, where said variance function has the form:

$$G = \left(1 - 1 - \sum_{i=3}^{P+1} a_i \; a_3 \; \ldots \; a_{p+1}\right) \Gamma_U \begin{pmatrix} 1 \\ -1 - \sum_{i=3}^{P+1} a_i \\ a_3 \\ \vdots \\ a_{p+1} \end{pmatrix}.$$

12. A method of simulating streamer positioning according to any one of claims 8 to 11, characterized in that while computing a particular value of a 'current object' of type 4, 5, 6, or 7, an autocorrelation function of the current or residual current data series is computed, and then a linear system of equations is set up and solved.

13. A method simulating streamer positioning according to claim 12, characterized in that while computing a particular value of a 'current object' of type 4, 5, 6, or 7, the linear system to be solved is conditioned by implementing a descent method, preferably the conjugate gradient method.

14. A method of simulating streamer positioning according to any one of claims 7 to 13, characterized in that the method provides the option of computing extrapolated values on a series of measured current values from which a tidal current has previously been subtracted so as to compute an extrapolated residual current, and then adding the tidal current corresponding to the instant for which the extrapolation has been made to said extrapolated residual current.

15. A method of simulating streamer positioning according to any one of claims 6 to 14, characterized in that the method comprises estimating the performance of different predictions of current by comparison with a measurement of current performed at the time corresponding to the time of the predictions.

16. A method of simulating streamer positioning according to any one of claims 6 to 15, characterized in that the method comprising estimating the performance of a 'current object' derived from predictions and/or measurements of current by comparing the measured streamer positioning and the simulated streamer positioning, said simulation taking account of the 'current object' whose performance is to be estimated.

17. A method of simulating streamer positioning according to claim 16, characterized in that the performance of the 'current object' is described by criteria which comprise the average of the absolute value of the difference between measurement and simulation of streamer positioning, and/or the difference predicted and measured streamer positioning below the value for which 90% of the prediction points are to be found.

18. A method of assisting the navigation of a ship towing at least one streamer in order to reduce zones of undercoverage and/or overcoverage generated during a geophysical data acquisition operation at sea during which the ship travels along a plurality of lines (Li, Li+1, Li+2) extending in a general Y direction defining an abscissa and forming an array covering a desired zone, the method being characterized in that it implements a method of simulating streamer positioning according to any preceding claim.

19. A method of assisting navigation according to claim 18, the ship having already traveled along one of the lines of said array, the method being characterized in that it comprises determining the set of {ship position; instant} pairs at regular intervals in space so as to define a track along which the orientation of the streamer at a given abscissa along the general orientation of the lines of the array is as close as possible to the orientation of an associated streamer during a previous pass of the ship along an adjacent line.

20. A method of assisting navigation according to either claim 18 or claim 19, characterized in that the method comprises the following steps:

selecting a 'current object' of appropriate type;

defining optimization parameters;

computing the positioning of a 'reference streamer' from data relating the streamer positioning of the adjacent profile and the optimization parameters;

taking account of ship speed and direction data and streamer positioning data at the time optimization computation is started;

creating a three-dimensional optimization grid with a first dimension (Y) parallel to said general direction, a second direction (X) being perpendicular to the general direction, and included in the horizontal plane, and the third dimension (DT) representing possible time increments between two nodes spaced apart by one grid cell in the general direction (Y);

simulating variations in the positioning of the streamer towed by a ship following all of the tracks defined by the nodes of the optimization grid;

for all of the possible tracks, computing a norm of the difference between simulated streamer positioning and reference streamer positioning; and computing an optimum track for which the associated norm is a minimum.

21. A method of assisting navigation according to claim 20, characterized in that the optimization step comprises minimizing a norm of the difference between reference streamer position and simulated streamer positioning.

22. A method of assisting navigations according to claim 21, characterized in that said normal to be minimized has the form:

$$H(X1, \delta t1) = \sum_{j=1}^{J} \sum_{k=1}^{K} |X_{reference}(k, j) - X_{predicted}(k, j)| f(k)$$

where:

X1 is series of J consecutive values for the position of the streamer head along the horizontal direction of the optimization grid perpendicular to the general direction;

δt1 is a series of J consecutive values for the duration taken by the streamer head to pass from one node of the optimization grid of coordinates ($X_{i1}$, $Y_j$, $\delta t_{k1}$) to a node having coordinates ($X_{i2}$, $Y_{j+1}$, $\delta t_{k2}$);

J is the number of nodes of the grid in said general direction (Y);

K is the number of curvilinear abscissa points along the discretized streamer;

$X_{reference}$(k,j) is the position along the X axis of the point "k" of the 'reference streamer' when the head thereof is at the jth plane of the optimization grid along the Y axis;

$X_{predicted}$(k,j) is the position along the X axis of the point "k" of the simulated streamer when the head thereof is at the jth plane of the optimization grid along the Y axis; and f(k) is weighting function applied to the difference between the simulated streamer and the reference streamer.

23. A method of assisting navigation according to claim 21 or claim 22, characterized in that the method implements an optimization criterion for said difference between the measured and predicted streamer-positioning data.

24. A method of assisting navigation according to any one of claims 19 to 23, characterized in that the step of optimizing zone coverage is implemented in real time so as to provide the ship with a series of {instant; ship position; ship speed} triplets to follow so as to optimize the path of the ship along a line that the ship is surveying.

25. An application of the method of assisting navigation according to any one of claims 19 to 23 to determining a path and a starting time associated with a forthcoming line that is to be surveyed by the ship, and also for determining the best forthcoming line to survey.

26. An application according to claim 25, characterized in that a line starting time is sought from within a given time window that corresponds to minimizing undercoverage and overcoverage.

27. A method of predicting the coverage fraction associated with an operation of acquiring geophysical data that is to be performed at sea over a given zone, the method being characterized in that it implements simulating the track of a ship including a method of assisting navigation according to any one of claims 18 to 23.

* * * * *